(12) United States Patent
Kimura et al.

(10) Patent No.: US 11,766,853 B2
(45) Date of Patent: Sep. 26, 2023

(54) WHITE LAMINATED FILM AND RECORDING MATERIAL

(71) Applicant: Mitsubishi Chemical Corporation, Tokyo (JP)

(72) Inventors: Hidetaka Kimura, Tokyo (JP); Keita Kawanami, Tokyo (JP); Taishi Kawasaki, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/553,802

(22) Filed: Aug. 28, 2019

(65) Prior Publication Data

US 2019/0381774 A1    Dec. 19, 2019

Related U.S. Application Data

(63) Continuation of application No. PCT/JP2018/008008, filed on Mar. 2, 2018.

(30) Foreign Application Priority Data

| Mar. 2, 2017 | (JP) | 2017-039869 |
| Mar. 2, 2017 | (JP) | 2017-039870 |
| Nov. 14, 2017 | (JP) | 2017-218862 |
| Nov. 14, 2017 | (JP) | 2017-218863 |

(51) Int. Cl.

| *B32B 27/36* | (2006.01) |
| *B32B 7/06* | (2019.01) |
| *B32B 27/08* | (2006.01) |
| *B32B 27/18* | (2006.01) |
| *G03G 7/00* | (2006.01) |
| *B32B 27/20* | (2006.01) |
| *B32B 38/10* | (2006.01) |
| *C08K 3/20* | (2006.01) |
| *C08K 3/36* | (2006.01) |
| *C08K 5/00* | (2006.01) |

(52) U.S. Cl.
CPC ............... *B32B 27/36* (2013.01); *B32B 7/06* (2013.01); *B32B 27/08* (2013.01); *B32B 27/18* (2013.01); *G03G 7/0006* (2013.01); *B32B 27/20* (2013.01); *B32B 38/10* (2013.01); *B32B 2250/03* (2013.01); *B32B 2250/04* (2013.01); *B32B 2250/24* (2013.01); *B32B 2250/244* (2013.01); *B32B 2250/40* (2013.01); *B32B 2255/26* (2013.01); *B32B 2264/102* (2013.01); *B32B 2264/12* (2013.01); *B32B 2270/00* (2013.01); *B32B 2307/21* (2013.01); *B32B 2307/402* (2013.01); *B32B 2307/514* (2013.01); *B32B 2307/538* (2013.01); *B32B 2307/72* (2013.01); *B32B 2307/748* (2013.01); *B32B 2307/75* (2013.01); *B32B 2554/00* (2013.01); *C08K 3/20* (2013.01); *C08K 3/36* (2013.01); *C08K 5/0025* (2013.01); *G03G 7/00* (2013.01); *Y02W 30/64* (2015.05)

(58) Field of Classification Search
None
See application file for complete search history.

(56) References Cited

U.S. PATENT DOCUMENTS

| 4,783,375 | A | * | 11/1988 | Hashimoto | ............ B41M 5/395 |
| | | | | | 428/32.87 |
| 5,242,887 | A | * | 9/1993 | Usui | ...................... B41M 5/529 |
| | | | | | 428/32.5 |
| 5,322,891 | A | * | 6/1994 | Takahashi | ............... C08L 83/04 |
| | | | | | 252/582 |
| 5,407,724 | A | * | 4/1995 | Mimura | .................... C08J 7/043 |
| | | | | | 428/32.67 |
| 5,422,175 | A | * | 6/1995 | Ito | ......................... B29C 55/005 |
| | | | | | 428/304.4 |
| 5,516,865 | A | * | 5/1996 | Urquiola | ............ C08F 220/1818 |
| | | | | | 524/561 |
| 5,560,796 | A | * | 10/1996 | Yoshimura | ........... C04B 41/4511 |
| | | | | | 428/355 R |
| 5,660,931 | A | | 8/1997 | Kim et al. | |
| 5,665,514 | A | * | 9/1997 | Shirai | ..................... B32B 27/08 |
| | | | | | 430/201 |
| 5,698,489 | A | * | 12/1997 | Shirai | ..................... B41M 5/41 |
| | | | | | 428/304.4 |
| 5,712,222 | A | * | 1/1998 | Shirai | ..................... B41M 5/52 |
| | | | | | 503/227 |

(Continued)

FOREIGN PATENT DOCUMENTS

| CN | 1974637 A | 6/2007 |
| CN | 101348602 A | 1/2009 |

(Continued)

OTHER PUBLICATIONS

"Shin-Etsu—Reactive & Non-Reactive Modified Silicone Fluid" (2016) (Year: 2016).*

(Continued)

*Primary Examiner* — Vivian Chen
(74) *Attorney, Agent, or Firm* — Morgan, Lewis & Bockius LLP

(57) ABSTRACT

In order to provide an extremely cost-advantageous laminated white film for use as a recording material that is an information printing medium in place of paper such as copy paper, proposed is a laminated white film having a functional layer comprising an antistatic agent on at least one surface of a polyester film having an apparent density of 0.7 to 1.3 g/cm³ and a thickness of 10 to 1000 μm, wherein the polyester film comprises a polyester-incompatible polymer.

19 Claims, No Drawings

(56) References Cited

U.S. PATENT DOCUMENTS

| | | | | |
|---|---|---|---|---|
| 5,811,371 | A * | 9/1998 | Egashira | B41M 5/44 503/227 |
| 5,935,903 | A * | 8/1999 | Goss | B41M 5/41 503/227 |
| 6,096,684 | A * | 8/2000 | Sasaki | C08J 5/18 503/227 |
| 6,130,278 | A * | 10/2000 | Hibiya | B32B 27/36 524/229 |
| 6,183,856 | B1 * | 2/2001 | Amon | B32B 27/08 428/318.4 |
| 6,316,385 | B1 * | 11/2001 | Usuki | B41M 5/42 428/913 |
| 6,348,258 | B1 * | 2/2002 | Topolkaraev | B32B 27/285 428/317.9 |
| 6,482,510 | B1 * | 11/2002 | Rajan | C08F 283/12 428/428 |
| 2001/0036545 | A1 * | 11/2001 | Nishi | B32B 3/26 428/319.3 |
| 2002/0058758 | A1 * | 5/2002 | Culbertson | C09D 123/10 525/240 |
| 2002/0183445 | A1 * | 12/2002 | Ohashi | C08K 3/30 524/806 |
| 2003/0144146 | A1 * | 7/2003 | Laney | B41M 5/42 503/227 |
| 2004/0091708 | A1 * | 5/2004 | Kawazu | B41M 5/52 428/402.22 |
| 2004/0167027 | A1 * | 8/2004 | Smith | B41M 5/42 503/227 |
| 2004/0175560 | A1 * | 9/2004 | Suh | B32B 27/20 428/317.9 |
| 2004/0241352 | A1 * | 12/2004 | Shih | B41M 5/5272 428/32.38 |
| 2005/0104951 | A1 * | 5/2005 | Mitsuyasu | B41M 5/5272 347/171 |
| 2005/0222375 | A1 * | 10/2005 | Mitsuyasu | C08G 63/199 528/272 |
| 2005/0261438 | A1 * | 11/2005 | Beppu | C08L 33/12 525/330.3 |
| 2006/0019043 | A1 * | 1/2006 | Kronzer | B44C 1/1725 428/32.51 |
| 2006/0229202 | A1 * | 10/2006 | Yuki | C08G 18/664 503/227 |
| 2007/0082196 | A1 * | 4/2007 | Ali | C09J 7/21 428/354 |
| 2007/0202276 | A1 * | 8/2007 | Arai | B41M 5/42 428/32.6 |
| 2007/0202277 | A1 * | 8/2007 | Arai | B41M 5/52 428/32.6 |
| 2008/0220190 | A1 * | 9/2008 | Majumdar | B41M 5/42 428/32.39 |
| 2009/0042016 | A1 | 2/2009 | Yoshida et al. | |
| 2010/0086736 | A1 | 4/2010 | Ueda et al. | |
| 2010/0196630 | A1 * | 8/2010 | Murakami | G03G 15/2028 428/32.39 |
| 2011/0305851 | A1 * | 12/2011 | Wang | C09D 11/00 346/21 |
| 2013/0045349 | A1 * | 2/2013 | Kronzer | C09D 4/06 264/293 |
| 2014/0030485 | A1 * | 1/2014 | Stoffel | D21H 17/63 427/407.1 |
| 2014/0205819 | A1 * | 7/2014 | Tomino | C08G 18/792 428/201 |
| 2016/0222178 | A1 * | 8/2016 | Funatsu | B32B 27/16 |
| 2016/0243868 | A1 * | 8/2016 | Kung | B41M 5/5272 |
| 2017/0313115 | A1 * | 11/2017 | Kung | B41M 5/5254 |
| 2019/0329580 | A1 * | 10/2019 | Yamato | B41M 5/395 |
| 2021/0269609 | A1 * | 9/2021 | Vavassori Bisutti | C09D 11/102 |

FOREIGN PATENT DOCUMENTS

| | | | |
|---|---|---|---|
| CN | 101402735 A | * | 4/2009 |
| CN | 101605841 A | | 12/2009 |
| EP | 0897947 A2 | | 2/1999 |
| EP | 1052268 A1 | | 11/2000 |
| GB | 875016 A | * | 8/1961 |
| JP | 07-047360 B | * | 5/1995 |
| JP | H07-199756 A | | 8/1995 |
| JP | H10-204196 A | | 8/1998 |
| JP | H11-116716 A | | 4/1999 |
| JP | H11-157037 A | | 6/1999 |
| JP | 2000-006348 A | | 1/2000 |
| JP | 2000-094617 A | | 4/2000 |
| JP | 2000-169610 A | | 6/2000 |
| JP | 2001-026089 A | | 1/2001 |
| JP | 2001-049001 A | | 2/2001 |
| JP | 2001-056579 A | | 2/2001 |
| JP | 2005-234162 A | * | 9/2005 |
| JP | 2015-024576 A | * | 2/2015 |
| KR | 10-2015-0113834 A | | 10/2015 |
| KR | 10-2016-0046851 A | | 4/2016 |
| WO | WO 2015/114891 A | * | 8/2015 |

OTHER PUBLICATIONS

International Search Report issued in related International Patent Application No. PCT/JP2018/008008 dated May 22, 2018.

Extended European Search Report Issued in corresponding European Patent Application No. 18761242.9 dated Feb. 19, 2020.

Office Action issued in corresponding Chinese Patent Application No. 201880011701.1 dated Jan. 25, 2021.

Third Party Submission filed against corresponding Korean Patent Application No. 10-2019-7028778 dated Dec. 15, 2021.

Third Party Submission filed in related Japanese Patent Application No. 2017-218862 dated Nov. 22, 2021.

Third Party Submission filed in related Japanese Patent Application No. 2017-218863 dated Nov. 22, 2021.

Office Action issued in related Japanese Patent Application No. 2017-218862 dated Sep. 21, 2021.

Office Action issued in related Japanese Patent Application No. 2017-218863 dated Sep. 21, 2021.

Office Action issued in corresponding Japanese Patent Application No. 2017-218862 dated Feb. 8, 2022.

Office Action issued in corresponding Japanese Patent Application No. 2017-218863 dated Feb. 8, 2022.

Third Party Submission filed against corresponding Japanese Patent Application No. 2022-044958 dated Aug. 8, 2022.

Office Action issued in corresponding Korean Patent Application No. 10-2019-7028778 dated Nov. 18, 2022.

Office Action issued in corresponding Japanese Patent Application No. 2022-044958 dated Jan. 24, 2023.

Office Action issued in corresponding Japanese Patent Application No. 2022-044959 dated Jan. 24, 2023.

Office Action issued in corresponding Korean Patent Application No. 10-2019-7028778 dated May 16, 2023.

* cited by examiner

WHITE LAMINATED FILM AND RECORDING MATERIAL

TECHNICAL FIELD

The present invention relates to a laminated white film. More specifically, the present invention relates to a sheet made of a plastic, which is suitable as a recording material that is an information printing medium in place of paper such as copy paper.

BACKGROUND ART

With the increasing capabilities of copiers and printers, such apparatuses are now used to issue paper materials for various applications and in various forms, e.g., printing photos and images and issuing ledger sheets and vouchers in addition to printing and copying documents. As a result, the consumption of copy paper and printer paper in companies and homes is increasing.

Mass consumption of paper including copy paper and printer paper is not desirable from the viewpoint of suppressing deforestation and, accordingly, recycled paper is used that is recycled by collecting used paper and defibrating it into recycled pulp in a paper mill.

While a primary component of recycled paper is collected used paper, producing recycled paper from collected used paper requires a certain amount of new wood resources, thus, even when recycled paper is used in increased proportions, the consumption of wood resources remains, and therefore the use of recycled paper is not a fundamental solution to protect the forest environment. Also, the recycling process requires energy and is thus problematic from the energy saving viewpoint.

In addition, the quality of recycled paper is still inferior to that of high quality paper, thus copy paper made of recycled paper has reduced whiteness and appears grayish, and therefore there is a tendency that the degree of color development when printed is poor, and the image quality is poor.

Moreover, recycled paper likely requires more production cost and is thus more expensive than high quality paper.

With these various problems, it is the current situation that recycled paper is not commonly used in place of high quality paper.

In place of such recycled paper, proposed is paper that can be reused after being used by peeling off and removing an image formed on the paper surface by an electrophotographic method of a copier or the like. For example, a reusable recording material is disclosed wherein paper mainly composed of cellulose fiber is used as a base, a layer containing a polymer selected from polyvinyl alcohol, starch, carboxymethyl cellulose, polyvinyl acetate, and acrylic resin is provided on the image recording surface of the base, and a layer that contains a compound having a linear or branched alkyl group or alkenyl group and that has toner repellency is provided on the polymer-containing layer (see, for example, Patent Literature 1).

However, being configured such that the polymer layer is thin to reduce the cost of the polymer layer and that the base still requires paper, the recording material is not completely free of wood resources and is thus not a solution to protect the forest environment. Moreover, as long as paper is used, a recorded image migrates to the inside of paper fiber, and thus the peelability and removability are insufficient.

Accordingly, research has been conducted on synthetic paper made of a plastic as a material completely substitutable for paper, and, for example, polypropylene synthetic paper is used in articles of daily use (see, for example, Patent Literature 2).

CITATION LIST

Patent Literature

Patent Literature 1: Japanese Patent Laid-Open No. 2005-234162

Patent Literature 2: Japanese Patent Laid-Open No. 10-204196

SUMMARY OF INVENTION

Technical Problem

However, the synthetic paper described in Patent Literature 2 is susceptible to heat, and when used in copiers and printers wherein toner is fixed at a relatively high temperature, the synthetic paper melts and forms wrinkles in the copiers, possibly resulting in the problem of paper jam.

The present invention has been conceived in view of the above situation, and an object of the present invention is to provide an extremely cost-advantageous laminated white film usable as a recording material that is an information printing medium in place of paper such as copy paper. Also, another object of the present invention is to reduce film jam during the process of feeding the film in a copier as a recording material of copy paper and printer paper.

Solution to Problem

The gist of the present invention is in a laminated white film having a functional layer comprising an antistatic agent on at least one surface of a polyester film having an apparent density of 0.7 to 1.3 g/cm$^3$ and a thickness of 10 to 1000 µm, wherein the polyester film comprises a polyester-incompatible polymer.

Advantageous Effects of Invention

The laminated white film of the present invention is a film made of a plastic, which is usable as a recording material that is an information printing medium in place of paper such as copy paper and, moreover, is extremely cost-advantageous because the polyester film as a substrate contains, in addition to polyester, a polymer that is incompatible with the polyester. Furthermore, a toner image can be suitably transferred to the laminated white film of the present invention. That is, a toner image can be suitably transferred by a method such as an electrophotographic method or a thermal transfer method in which the toner image is transferred to a recording material. After the laminated white film is used as a recording material, characters and images formed with an image forming substance or the like on the surface can be easily peeled off and removed.

Also, since a functional layer containing an antistatic agent is provided on at least one surface of the polyester film, film jam during the process of feeding the film in copiers as a recording material of copy paper and printer paper can be reduced.

Moreover, due to a release agent contained in the functional layer, characters and images formed on the surface with an image forming substance or the like containing a thermoplastic resin can be easily peeled off and removed after the film is used as a recording material as described above, and thus the film can be recycled. Accordingly, the film has both toner image transferability, i.e., properties that allow the image forming substance to be fixed to the film substrate, and conflicting properties, i.e., properties that allow the image forming substance to be peeled off from the film substrate.

DESCRIPTION OF EMBODIMENTS

Below, the present invention will now be described in more detail.

First Embodiment

As an example of the first embodiment for carrying out the present invention, laminated white film 1 (which will be referred to as a "present laminated white film 1") having a functional layer containing an antistatic agent on at least one surface of a polyester film as a substrate will now be described.
<Polyester Film>

The polyester film that serves as the substrate of present laminated white film 1 preferably includes a polyester resin layer containing at least polyester as a main component resin and a polymer that is incompatible with the polyester.

Here, the "main component resin" means a resin that is contained in the largest proportion among the resin components constituting the polyester resin layer. The main component resin may account for 30% by mass or more, in particular 50% by mass or more, and in particular 80% by mass or more (including 100% by mass) of the resin components constituting the polyester resin layer.

The polyester film may have a single layer composed of the polyester resin layer or may have multiple layers composed of two, three, four, or more layers including the polyester resin layer, and the layer configuration is not particularly limited. That is, when the polyester film has a single layer, the polyester film means the polyester resin layer itself. When the polyester film has two or more layers, all layers may be composed of the polyester resin layer, or one or more layers may be composed of a resin layer other than polyester. Especially, all layers are preferably composed of the polyester resin layer.

In particular, the polyester film is preferably a laminate of two or more layers, and is more preferably a three-layer configuration composed of two surface layers and an intermediate layer (surface layer/intermediate layer/surface layer).

A two-layer laminated configuration means that the film is composed of two surface layers, and, a specific example may be a configuration in which the film is formed of two layers wherein the type of polyester constituting each layer or the formulation of the contained particles or the like is different.
(Polyester)

The polyester film as a substrate and, in particular, polyester constituting the polyester resin layer are not limited as long as they are obtained by polycondensing an aromatic dicarboxylic acid and an aliphatic glycol.

Examples of the aromatic dicarboxylic acid include terephthalic acid, isophthalic acid, and 2,6-naphthalenedicarboxylic acid. Examples of the aliphatic glycol include ethylene glycol, diethylene glycol, trimethylene glycol, tetramethylene glycol, neopentyl glycol, and 1,4-cyclohexanedimethanol.

Examples of representative polyesters include polyethylene terephthalate (PET), polyethylene-2,6-naphthalenedicarboxylate (PEN), and polybutylene terephthalate.

Such a polyester may be a homopolymer that is not copolymerized, or may be such a copolymerized polyester that 20 mol % or less of the dicarboxylic acid component is a dicarboxylic acid component other than the main component and/or 20 mol % or less of the diol component is a diol component other than the main component. The polyester may be a mixture thereof.

The polyester can be obtained by a conventionally known method such as a method in which the polyester is directly obtained by the reaction of a dicarboxylic acid and a diol, or a method in which a lower alkyl ester of a dicarboxylic acid and a diol are reacted in the presence of a conventionally known transesterification catalyst, and then a polymerization reaction is performed in the presence of a polymerization catalyst. Known polymerization catalysts are usable, such as an antimony compound, a germanium compound, a titanium compound, and an aluminum compound.

The intrinsic viscosity of the polyester, as a value measured by the method described in the Examples below, is preferably 0.55 to 0.75 dl/g, and, in particular, more preferably 0.60 dl/g or more and 0.70 dl or less.
(Polyester-Incompatible Polymer)

By causing a polyester-incompatible polymer to be contained in the polyester film, in particular, the polyester resin layer, numerous fine voids can be created in an at least uniaxially stretched polyester film. The fine voids not only can cause the polyester film to scatter light and provide white opacity but also can reduce the apparent density of the polyester film. Moreover, the fine voids facilitate an image forming substance containing a thermoplastic resin, such as toner, printed onto the surface of the polyester film to be fixed as well as peeled off and removed.

By causing a polyester-incompatible polymer to be contained in the surface layer of the polyester film, the polyester film when used as a recording material of copy paper and printer paper facilitates an image forming substance containing a thermoplastic resin, such as toner, printed onto the surface of the laminated white polyester film to be fixed as well as peeled off and removed. That is, due to the fine voids in the surface layer of the polyester film or the roughened surface, an anchor effect for favorably fixing the image forming substance can be exerted. Also, causing the polyester-incompatible polymer to be contained in the surface layer makes it possible to adjust how strongly the image forming substance is fixed and, thus, also makes it possible to easily peel off and remove the image forming substance. Surprisingly, such an effect can be similarly or much more significantly exerted when a functional layer, which will be described below, is provided on the surface of the polyester film.

In order to ensure sufficient masking properties and weight reduction, the polyester-incompatible polymer may be contained in the intermediate layer as necessary.

When the polyester film has a laminated configuration, the polyester-incompatible polymer may be contained in all polyester film layers, or may be selectively contained in a specific layer. Specifically, the polyester-incompatible polymer may be contained in at least one surface layer of the polyester film, or may be contained in the intermediate layer.

Conventionally known polyester-incompatible polymers are usable, and examples include polyolefin, polystyrene, polyacryl, and polycarbonate. Among these, polyolefin and polystyrene are preferable, and polyolefin is particularly preferable. Moreover, examples of polyolefin include polypropylene, polyethylene, poly-4-methylpentene-1, and amorphous polyolefin. Among these, polypropylene is more preferable in view of the ease of void formation and film formation.

A polyester that is different from the main component resin constituting the polyester film can also be used as a polyester-incompatible polymer.

When polypropylene is used as a polyester-incompatible polymer, the content of propylene units in polypropylene is preferably 80 mol % or more, more preferably 90 mol % or more, and even more preferably 95 mol % or more. By reducing the content of copolymer units other than propylene units and using the propylene units within the above range, fine voids can be sufficiently created.

As for the content of the polyester-incompatible polymer based on the polyester in the polyester resin layer, the polyester-incompatible polymer is preferably contained in a proportion of 1 to 70 parts by mass, more preferably 2 parts by mass or more and 50 parts by mass or less, even more preferably 3 parts by mass or more and 40 parts by mass or less, and particularly preferably 5 parts by mass or more and 35 parts by mass or less, based on 100 parts by mass of the polyester.

When polypropylene is used as a polyester-incompatible polymer, the lower limit of the melt flow index of polypropylene under conditions having a temperature of 230° C. and a load of 2.16 kg (21.2 N) is usually 0.5 ml/10 min or more, preferably 1 ml/10 min or more, more preferably 3 ml/10 min or more, and even more preferably 5 ml/10 min or more. When the melt flow index is within the above range, voids having a sufficient size can be created, and thus breaking during stretching can be likely avoided.

On the other hand, the upper limit is usually 50 ml/10 min or less, preferably 40 ml/10 min or less, more preferably 30 ml/10 min or less, and even more preferably 25 ml/10 min or less. When the upper limit is within the above range, detachment from clips during transverse stretching can be also avoided, and thus productivity can be maintained.

The lower limit of the content of the "polyester-incompatible polymer" in the polyester film is usually 1% by weight or more, preferably 2% by weight or more, more preferably 3% by weight or more, even more preferably 5% by weight or more, and particularly preferably 8% by weight or more. By using the polyester-incompatible polymer within the above range, a sufficient amount of fine voids is created in the film, thus the masking properties of the film are increased, and the apparent-density reducing effect, i.e., weight reduction, is sufficient. Also, film smoothness and writeability with a pencil or the like are also increased, and the film is also advantageous with respect to print feedability. Moreover, characters and images made of the printed image forming substance or the like are easily fixed to, and are easily peeled off and removed from, the film surface, and thus the film can be repeatedly used as a recording material of copy paper and printer paper.

On the other hand, the upper limit of the content of the "polyester-incompatible polymer" in the polyester film is usually 70% by weight or less, preferably 50% by weight or less, more preferably 40% by weight or less, even more preferably 35% by weight or less, particularly preferably 30% by weight or less, and most preferably 25% by weight or less. When the "polyester-incompatible polymer" is used in a content within the above range, there is a tendency that the amount of created voids is not excessive, and breaking during stretching is likely suppressed.

When the polyester film has a laminated configuration, the content may mean the average content in all layers of the polyester film, or may mean the content in a specific layer. Specifically, it may mean the content in at least one surface layer of the polyester film or the content in an intermediate layer.

When the polyester film is formed of three or more layers, the intermediate layer may contain a recycled article such as an excessive part generated during film production, such as an edge part (outside edge), a master roll edge part (outside edge), and an excessive master roll part (inner wound part), as long as the gist of the present invention is not impaired. The use of a recycled article has the effect of reducing cost and environmental burden.

From the viewpoint of color regulation and, also, film formation stability resulting from lowered intrinsic viscosity, the content of a recycled article in the intermediate layer is preferably 95% by weight or less, more preferably 85% by weight or less, even more preferably 70% by weight or less, particularly preferably 60% by weight or less, and most preferably 40% by weight or less based on the intermediate layer. The lower limit of the content of a recycled article in the intermediate layer is not limited, and may be 0% by weight. From the viewpoint of cost reduction, the content is preferably 1% by weight or more, more preferably 3% by weight or more, and even more preferably 5% by weight or more.

(Metal Compound Particles)

Metal compound particles can be contained in the polyester film to further increase the masking properties and whiteness. When the polyester film is formed of two or more layers, metal compound particles are also preferably contained in the polyester resin layer.

When the polyester film is formed of three or more layers, the layer containing the metal compound particles may be a surface layer or an intermediate layer. In order to effectively increase masking properties and whiteness, the metal compound particles are preferably contained in the surface layer.

The metal compound particles tend to supplement white opacity resulting from the light scattering effect provided by fine voids formed by blending the "polyester-incompatible polymer", and thus there is a tendency that greater masking properties and whiteness are obtained.

Examples of the metal compound particles include titanium oxide, calcium carbonate, barium sulfate, magnesium carbonate, barium carbonate, calcium sulfate, calcium phosphate, magnesium phosphate, kaolin, aluminum oxide, and zirconium oxide. In particular, from the viewpoint of increasing masking properties and whiteness, titanium oxide, calcium carbonate, barium sulfate, and the like are preferable, and, among these, titanium oxide is particularly suitable.

The lower limit of the average particle diameter of the metal compound particles is usually 0.05 μm or more, preferably 0.10 μm or more, more preferably 0.20 μm or more, and even more preferably 0.25 μm or more, and the upper limit is usually 0.50 μm or less, preferably 0.45 μm or less, and more preferably 0.40 μm or less. By using metal compound particles having an average particle diameter that is within the above range, there is a tendency that sufficient masking properties are attained when a film is formed, and offset that occurs particularly when the entire front and back surfaces of the film are printed is improved.

The shape of the compound particles is not particularly limited, and may be any of the spherical, aggregated, rod-like, flat, and like shapes. Also, the hardness, specific gravity, color, and like features thereof are not particularly limited. Concerning these particles, two or more types may be used in combination as necessary.

The lower limit of the content of the metal compound particles is preferably 1% by weight or more, more preferably 2% by weight or more, and even more preferably 3% by weight or more, and the upper limit is usually 30% by weight or less, preferably 20% by weight or less, more preferably 15% by weight or less, even more preferably 13% by weight or less, and particularly preferably 10% by weight or less. By setting the content of the metal compound particles to the above range, sufficient masking properties can be imparted, and moreover the polyester film tends to be cost-advantageous and optimally usable as a recording material of copy paper and printer paper in place of a sheet made of paper.

When the polyester film has a laminated configuration, the content may mean the average content in all layers of the polyester film, or may mean the content in a specific layer. Specifically, it may mean the content in at least one surface layer of the polyester film or the content in an intermediate layer.

(Particles Other than Metal Compound Particles)

In order to increase the handleability and smoothness of present laminated white film 1, the polyester film may contain particles other than the metal compound particles exemplified above.

Specific examples of particles other than the metal compound particles exemplified above include silica particles and organic particles. Specific examples of organic particles include acrylic resin, styrene resin, urea resin, phenol resin, epoxy resin, and benzoguanamine resin. In particular, silica particles are preferable in that an effect is obtained even from a small amount.

The average particle diameter of the particles (silica particles or organic particles) other than the metal compound particles exemplified above is preferably more than 0.50 μm, more preferably 1.0 μm or more, even more preferably 1.5 μm or more, and particularly preferably 2.0 μm or more. By setting the average particle diameter of the particles other than the metal compound particles to the above range, there is a tendency that sufficient smoothness can be imparted. The upper limit of the average particle diameter of the particles is usually 15.0 μm or less, preferably 12.0 μm or less, more preferably 10.0 μm or less, and even more preferably 8.0 μm or less. By setting the average particle diameter to the above range, there is a tendency that the film surface does not become excessively rough, characters and images formed of an image forming substance or the like printed onto the film surface are easily peeled off and removed, and the film can be repeatedly used as a recording material of copy paper or printer paper. Moreover, it is not necessary to extremely increase the thickness of the surface layer from the viewpoint of particle detachment, and the optimum thickness range is broad, thereby giving a preferable form.

The shape of the particles (silica particles or organic particles) other than the metal compound particles exemplified above is not particularly limited, and may be any of the spherical, aggregated, rod-like, flat, and like shapes. Also, the hardness, specific gravity, color, and like features thereof are not particularly limited. Concerning these particles, two or more types may be used in combination as necessary.

The content of the particles (silica particles or organic particles) other than the metal compound particles exemplified above cannot be generalized because it also depends on the average particle diameter. For example, based on the polyester film containing silica particles or organic particles, the content is usually 5% by weight or less, preferably 3% by weight or less, more preferably 2% by weight or less, and even more preferably 1% by weight or less, and the lower limit is preferably 0.005% by weight or more, more preferably 0.05% by weight or more, and even more preferably 0.1% by weight or more. With the content being within the above range, there is a tendency that the film can be provided with an appropriate surface roughness, and the intended smoothness provision can be achieved. Also, there is a tendency that not only smoothness is provided but also characters and images formed of an image forming substance or the like printed onto the film surface are easily peeled off and removed, and an optimum film can be obtained that can be repeatedly used as a recording material of copy paper or printer paper. Moreover, as a role of silica particles and organic particles, they tend to further increase writeability for pencils, mechanical pencils, ballpoint pens, and the like.

When the polyester film has a laminated configuration, the content may mean the average content in all layers of the polyester film, or may mean the content in a specific layer. Specifically, it may mean the content in at least one surface layer of the polyester film or the content in an intermediate layer.

(Other Components)

Since the polyester film as a substrate of present laminated white film 1 contains an incompatible polymer, fine independent spaces (voids) can be created inside the film by at least uniaxially stretching an extruded sheet. Accordingly, for example, a surfactant, inert particles, a fluorescent whitening agent, or the like may be blended in order to further reduce the size of the voids or increase masking properties and whiteness.

In addition to the above-described particles and polyester-incompatible polymer, a conventionally known antioxidant, heat stabilizer, lubricant, antistatic agent, dye, pigment, and the like can be added to the polyester film as necessary. Depending on the application, an ultraviolet absorber, a benzoxazinone ultraviolet absorber in particular, or the like may be contained.

(In the Case of Laminated Configuration)

When the polyester film as a substrate of present laminated white film 1 has a laminated configuration of two layers, either one of the layers is preferably the above polyester resin layer, and when three or more layers, the surface layers among the layers are preferably the above polyester resin layer.

For example, in the case of a laminated configuration composed of three or more layers, fine voids can be created by stretching the film when the surface layers contain the above polyester and a polymer that is incompatible with the polyester, and thus weight reduction, masking properties, and whitening can be achieved. Moreover, the surface roughness can be regulated, thus writeability can be increased, and, also, an image formed of an image forming substance or the like is easily fixed and can also be peeled off after use.

When the surface layer further contains metal compound particles, the masking properties and whiteness can be further increased, and by further containing particles other than the metal compound particles, smoothness can be increased.

On the other hand, as long as the above polyester is contained, the intermediate layer other than the surface layers may contain a polymer that is incompatible with the polyester, metal compound particles, and particles other than the metal compound particles, as necessary. It is preferable from the viewpoint of cost reduction and environmental load reduction to minimize the content of metal compound particles and the content of particles other than the metal compound particles and to use recycled polyester blended.
(Thickness)

The thickness of the polyester film is preferably 10 μm to 1000 μm, more preferably 20 μm or more and 500 μm or less, even more preferably 30 μm or more and 400 μm or less, and particularly preferably 38 μm or more and 350 μm or less.

The use of the polyester film within the above range enables sufficient hardness (tautness) and handleability of the film to be attained, and film jam during the process of feeding in a copier to be reduced.

When the polyester film has a laminated configuration of three or more layers as described above, the thickness of each surface layer is preferably 1 μm to 50 μm, more preferably 2 μm or more and 40 μm or less, even more preferably 3 μm or more and 30 μm or less, and particularly preferably 4 μm or more and 25 μm or less. The use of the polyester film within the above range enables capabilities of the above-described metal compound particles and particles other than the metal compound particles to be sufficiently exerted, and the production cost to be kept low.
(Apparent Density)

The lower limit of the apparent density of the polyester film is 0.7 g/cm$^3$ or more, preferably 0.75 g/cm$^3$ or more, and more preferably 0.8 g/cm$^3$ or more. By setting the lower limit of the apparent density to the above range, the film strength can be maintained, film jam during the process of feeding the film in a copier can be reduced when the film is used as a recording material that is an information printing medium in place of paper such as copy paper or printer paper, and optimal printing can be performed.

On the other hand, the upper limit of the apparent density is 1.3 g/cm$^3$ or less, preferably 1.2 g/cm$^3$ or less, and more preferably 1.1 g/cm$^3$ or less. Setting the upper limit of the apparent density to the above range reduces workload when carrying a large amount of printed matter and, moreover, enables the reduction of environmental load due to the reduction of $CO_2$ produced during the course of transporting the film (sheet) and the reduction of cost.

The apparent density of the polyester film can regulate forming fine independent voids inside the film by blending an incompatible polymer having a specific gravity smaller than that of polyester that is the main component resin and stretching the film at least uniaxially. However, the present invention is not limited to such methods.
(Physical Properties of Polyester Film)

The arithmetic mean roughness (Ra) of the surface of the above polyester film is in accordance with JIS B 0601 (2001). The arithmetic mean roughness (Ra) varies according to the application in which the polyester film is used, and the upper limit is usually 950 nm or less, preferably 850 nm or less, and more preferably 800 nm or less. By using the polyester film having an arithmetic mean roughness (Ra) within the above range, there is a tendency that characters and images made of an image forming substance or the like containing a thermoplastic resin formed on the film surface are easily fixed to the film surface and can be easily peeled off and removed, and the film can be repeatedly used as a recording material of copy paper and printer paper.

On the other hand, the lower limit of the arithmetic mean roughness (Ra) is usually 100 nm or more, preferably 200 nm or more, more preferably 300 nm or more, and even more preferably 350 nm or more. By setting the arithmetic mean roughness (Ra) to the above range, there is a tendency that sufficient masking properties and feedability can be provided, and a film optimally used as a recording material of copy paper and printer paper can be provided. Moreover, there is a tendency that the polyester film has sufficient writeability.

The b value (a reflection method), which is an index representing the yellowness of a polyester film, is usually 0 or less, preferably −0.20 or less, more preferably −0.40 or less, even more preferably −0.50 or less, and particularly preferably −0.60 or less. The lower limit is not particularly limited, and is preferably −5.0 or more. By using the polyester film within the above range, yellowness is suppressed, and favorable whiteness can be attained. Moreover, when the polyester film is used as a recording material for color printing, the resulting image tends to have an excellent quality.

The heat shrinkage of the polyester film in the film longitudinal direction (MD) and the film width direction (TD) at 150° C. for 30 minutes is usually 2.8% or less, preferably 2.3% or less, and more preferably 2.0% or less as an absolute value.

By setting the heat shrinkage of the polyester film to the above range, the dimensional stability of the film can be prevented from being thermally impaired when printing is performed on a recording material by a method such as an electrophotographic method or a thermal transfer method. There is a tendency that even at the edge part of the film (sheet) in particular, i.e., a part where wrinkles are likely to be formed, wrinkles of the polyester film can be suppressed, and the phenomenon of image quality deterioration resulting from distortion or unevenness of characters and images can be suppressed. It is preferable not to allow wrinkles to be formed as much as possible because wrinkles cannot be eliminated once they are formed, and make it impossible to repeatedly use the polyester film as a recording material of copy paper and printer paper.

The masking properties (OD) of the polyester film are usually 0.30 or more, preferably 0.35 or more, more preferably 0.40 or more, and even more preferably 0.45 or more when a single film is measured by a Macbeth densitometer. By using the polyester film within the above range, there is a tendency that the offset is reduced when both surfaces of the film are entirely printed, and high-quality characters and images can be obtained. On the other hand, the upper limit of the masking properties (OD) is not particularly limited, and is preferably 1 or less and more preferably 0.9 or less in view of the balance between the masking properties and other physical properties.

The lower limit of the whiteness of the polyester film is usually 80.0% or more, preferably 81.0% or more, more preferably 82.0% or more, even more preferably 83.0% or more, and particularly preferably 83.5% or more when the Hunter whiteness (Wb) of a single film is measured by a colorimeter. By setting the whiteness to the above range, there is a tendency that characters and images have high definition and are preferable in terms of quality, for example, when the polyester film is used as a recording material of copy paper and printer paper which is an information printing medium in place of paper, especially when color printing is performed. Depending on the application in which the polyester film is used, a greater whiteness is more preferable to provide a sense of luxury, but the upper limit is not particularly limited. On the other hand, when the polyester film is used in an application where there is a concern about gloss, a preferable upper limit of range is 95.0% or less.
<Functional Layer>

Next, the functional layer constituting present laminated white film 1 will now be described.

This functional layer can play, for example, a role of a recording layer, to the layer surface of which the image forming substance is directly attached. The recording layer in the present invention is a layer that plays a role of not only fixing the attached image forming substance, but also allowing the image forming substance to be removed together with a resin layer, which will be described below, when the resin layer is provided.

The functional layer in present laminated white film 1 preferably has antistatic capabilities and release capabilities.

Present laminated white film 1 preferably has a polyester resin layer containing polyester and a polyester-incompatible polymer and more preferably has the polyester resin layer as a surface layer, in order to achieve a reduced apparent density, whitening without incurring cost, and easily peeling off and removing characters and images of a printed image forming substance or the like containing a thermoplastic resin. However, it has been found that when a functional layer is provided, it may be difficult in some cases to exert the capability of easily peeling off and removing characters and images of an image forming substance or the like on the surface, and thus the functional layer preferably has release capabilities.

(Antistatic Agent)

Present laminated white film 1 when used as a recording material of copy paper and printer paper preferably has, on at least one surface, a functional layer containing an antistatic agent in order to, for example, prevent feeding of multiple sheets during the paper feeding of a copier and a multifunctional device and prevent sheets from adhering to each other during the handling of sheets. Also, by containing an antistatic agent in the functional layer, each sheet can be independently fed without film jam in a multifunctional device and without feeding multiple printed films, and attachment of dust can be prevented. Therefore, a film having good quality and a printed film having good image quality can be obtained.

The antistatic agent contained in the functional layer is not particularly limited, and conventionally known antistatic agents are usable. For example, a polymer-type antistatic agent is preferable because of its good heat resistance and moist heat resistance.

Examples of the polymer-type antistatic agent include compounds having an ammonium group, polyether compounds, compounds having a sulfonic acid group, betaine compounds, and conductive polymers.

In view of antistatic capabilities, compounds having an ammonium group and compounds having a sulfonic acid group are preferable and, in view of compatibility with other materials such as a release agent that form the functional layer, compounds having an ammonium group are more preferable. Conductive polymers have greatest antistatic properties and are thus preferable. However, the use may be limited because their material cost is high, and may be limited in applications where coloration is extremely avoided.

Examples of the compounds having an ammonium group include ammonium compounds of aliphatic amines, alicyclic amines, and aromatic amines.

The compounds having an ammonium group are preferably polymer-type compounds having an ammonium group, and the ammonium group is preferably incorporated, not as a counter ion, but in the main chain or side chain of the polymer. Examples of such compounds include polymers obtained by polymerizing a monomer containing an addition-polymerizable ammonium group or an ammonium group precursor such as amine, and such polymers are suitably used. The polymer may be a homopolymer of a monomer containing an addition-polymerizable ammonium group or an ammonium group precursor such as amine, or may be a copolymer of such a monomer and another monomer.

Among the compounds having an ammonium group, a compound having a pyrrolidinium ring is also preferable in terms of having excellent antistatic properties and heat stability.

The two substituents bonded to the nitrogen atom of the compound having a pyrrolidinium ring are each independently an alkyl group, a phenyl group, or the like, and this alkyl group and phenyl group may be substituted with the following groups.

Examples of substitutable groups include a hydroxyl group, an amide group, an ester group, an alkoxy group, a phenoxy group, a naphthoxy group, thioalkoxy, a thiophenoxy group, a cycloalkyl group, a trialkylammoniumalkyl group, a cyano group, and a halogen. The two substituents bonded to the nitrogen atom may be chemically bonded, and examples include —$(CH_2)_m$— (m=an integer of 2 to 5), —$CH(CH_3)CH(CH_3)$—, —CH=CH—CH=CH—, —CH=CH—CH=N—, —CH=CH—N=CH—, —$CH_2OCH_2$—, and —$(CH_2)_2O(CH_2)_2$—.

The polymer having a pyrrolidinium ring can be obtained by cyclopolymerization of a diallylamine derivative using a radical polymerization catalyst. Polymerization can be performed by a known method using a polymerization initiator such as hydrogen peroxide, benzoyl peroxide, or tertiary butyl peroxide in water as a solvent or in a polar solvent such as methanol, ethanol, isopropanol, formamide, dimethylformamide, dioxane, or acetonitrile, but is not limited thereto. In the present invention, a compound having a carbon-carbon unsaturated bond that is polymerizable with a diallylamine derivative may be used as a copolymerization component.

Concerning the compound having an ammonium group, the antistatic agent is preferably a polymer having the structure of the following formula (1) in terms of having excellent antistatic properties and moist heat stability. The compound may be a homopolymer or a copolymer having the structure of the following formula (1), or, moreover, may be a copolymer involving other multiple components.

[Formula 1]

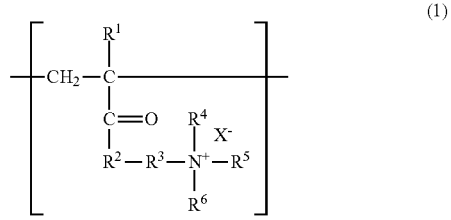

(1)

For example, in the above formula, substituent $R^1$ is a hydrogen atom or a hydrocarbon group having 1 to 20 carbon atoms such as an alkyl group or a phenyl group; $R^2$ is —O—, —NH—, or —S—; $R^3$ is an alkylene group having 1 to 20 carbon atoms or another structure capable of achieving the structure of Formula 1; $R^4$, $R^5$, and $R^6$ each independently represent a hydrogen atom, a hydrocarbon group having 1 to 20 carbon atoms such as an alkyl group or a phenyl group, or a hydrocarbon group provided with a functional group such as hydroxyalkyl group; and X— is any of various counter ions.

Among those described above, in view of having excellent antistatic properties and moist heat stability in particular, in formula (1), substituent $R^1$ is preferably a hydrogen atom or an alkyl group having 1 to 6 carbon atoms; $R^3$ is preferably an alkyl group having 1 to 6 carbon atoms; and $R^4$, $R^5$, and $R^6$ each independently are preferably a hydrogen atom or an alkyl group having 1 to 6 carbon atoms, and more preferably any one of $R^4$, $R^5$, and $R^6$ is a hydrogen atom, and the other substituents are alkyl groups having 1 to 4 carbon atoms.

Examples of an anion that serves as a counter ion of the ammonium group in the above-described compound having an ammonium group include halogen, sulfonate, sulfate, phosphate, nitrate, and carboxylate ions.

The number average molecular weight of the compound having an ammonium group is usually 1000 to 500000, preferably 2000 to 350000, and more preferably 5000 to 200000. When the molecular weight is less than 1000, the strength of the functional layer may be impaired, or the heat stability may be poor. Moreover, when the molecular weight exceeds 500000, there is a possibility that the viscosity of the coating solution is increased, and handleability and coatability are impaired.

Examples of the polyether compound include acrylic resins having polyethylene oxide, polyether ester amide, or polyethylene glycol in the side chain.

The compound having a sulfonic acid group refers to a compound containing sulfonic acid or a sulfonic acid salt within the molecule, and, for example, a compound in which a large amount of sulfonic acid or a sulfonic acid salt is present, such as polystyrenesulfonic acid, is suitably used.

Examples of the conductive polymer include polythiophene-based, polyaniline-based, polypyrrole-based, and polyacetylene-based conductive polymers, and, in particular, polythiophene-based conductive polymers in which, for example, poly(3,4-ethylenedioxythiophene) is used in combination with polystyrenesulfonic acid are suitably used. The conductive polymer is more suitable than the above-described other antistatic agents in that the resistance value is lowered. However, in applications where coloration and cost are concerned, measures need to be taken, such as reducing the amount of the conductive polymer used.

The lower limit of the content of the antistatic agent in the functional layer is usually 1% by weight or more, preferably 3% by weight or more, more preferably 5% by weight or more, even more preferably 10% by weight or more, and particularly preferably 20% by weight or more. The upper limit is usually 80% by weight or less, preferably 70% by weight or less, more preferably 60% by weight or less, even more preferably 55% by weight or less, and particularly preferably 50% by weight or less. By using the antistatic agent within the above range, sufficient antistatic properties can be obtained, and the functional layer tends to be effective for preventing films from adhering to each other and preventing dust from attaching and have excellent print feedability and image quality.

(Release Agent)

The functional layer is preferably provided with release capabilities such that an image forming substance containing a thermoplastic resin formed on the film surface can be suitably peeled off and removed after printing.

The functional layer having release capabilities may be the same as or different from the functional layer containing an antistatic agent. In particular, for the reasons described below, the functional layer containing an antistatic agent preferably has release capabilities. When the functional layer having release capabilities is different from the functional layer containing an antistatic agent, the functional layer having release capabilities is preferably an outer layer.

It has been found that by imparting release capabilities to the functional layer, the function to peel off and remove an image forming substance or the like can be more suitably performed. That is, a method has been found that achieves the mutually contradictory characteristics of fixability and peelability with a single functional layer at a higher level. It can be said that this technology is an extremely effective technology, considering that the peeling capabilities cannot be achieved by a commonly used functional layer having fixing capabilities while the fixing capabilities cannot be achieved by a commonly used functional layer having peeling capabilities. Even when a functional layer having fixing capabilities and a functional layer having peeling capabilities are laminated, it is difficult to exert both capabilities, and the capabilities of the functional layer disposed as the outermost layer are mainly reflected.

In order to impart release capabilities for an image forming substance or the like, the functional layer preferably contains a release agent.

The release agent is not particularly limited, and conventionally known release agents are usable, such as long chain alkyl group-containing compounds, fluorine compounds, silicone compounds, and waxes. Among these, in terms of having low contamination and excellent peel-off and removal of an image forming substance, long chain alkyl compounds and fluorine compounds are preferable, and long chain alkyl compounds are more preferable. When an emphasis is placed on peeling off and removing an image forming substance in particular, a silicone compound is preferable. When an emphasis is placed on the surface printability for an image forming substance, a wax is effective. One of these release agents may be used singly, or two or more may be used in combination.

When providing a functional layer by coating, a long chain alkyl group-containing compound is preferable among the above release agents from the viewpoint of wettability to the polyester film.

The long chain alkyl group-containing compound refers to a compound having a linear or branched alkyl group usually having 6 or more, preferably 8 or more, and more preferably 12 or more carbon atoms.

Examples of the alkyl group include a hexyl group, an octyl group, a decyl group, a lauryl group, an octadecyl group, and a behenyl group.

Examples of the compound having an alkyl group include various long chain alkyl group-containing polymer compounds, long chain alkyl group-containing amine compounds, long chain alkyl group-containing ether compounds, and long chain alkyl group-containing quaternary ammonium salts. In view of heat resistance and contamination, a polymer compound is preferable. From the viewpoint of effectively obtaining releasability, a polymer compound having a long chain alkyl group in a side chain is more preferable.

The polymer compound having a long chain alkyl group in a side chain can be obtained by reacting a polymer having a reactive group with a compound having an alkyl group that can react with the reactive group. Examples of the reactive group include a hydroxyl group, an amino group, a carboxyl group, and an acid anhydride. Examples of compounds having these reactive groups include polyvinyl alcohol, polyethylene imine, polyethylene amine, a reactive group-containing polyester resin, and a reactive group-containing poly(meth)acrylic resin. Among these, polyvinyl alcohol is preferable in view of releasability and handleability.

Examples of the compound having an alkyl group that can react with the reactive group include long chain alkyl group-containing isocyanates such as hexyl isocyanate, octyl isocyanate, decyl isocyanate, lauryl isocyanate, octadecyl isocyanate, and behenyl isocyanate; long chain alkyl group-containing acid chlorides such as hexyl chloride, octyl chloride, decyl chloride, lauryl chloride, octadecyl chloride, and behenyl chloride; long chain alkyl group-containing amines; and long chain alkyl group-containing alcohols. Among these, in view of releasability and handleability, long chain alkyl group-containing isocyanates are preferable, and octadecyl isocyanate is particularly preferable.

The polymer compound having a long chain alkyl group in a side chain can also be obtained by polymerization of a long chain alkyl (meth)acrylate or copolymerization of a long chain alkyl (meth)acrylate with another vinyl group-containing monomer. Examples of the long chain alkyl (meth)acrylate include hexyl (meth)acrylate, octyl (meth)acrylate, decyl (meth)acrylate, lauryl (meth)acrylate, octadecyl (meth)acrylate, and behenyl (meth)acrylate.

The fluorine compound is a compound containing a fluorine atom within the compound. In order to reduce contamination, the fluorine compound is preferably a polymer containing a fluorine atom. In terms of a coated appearance by in-line coating, an organic fluorine compound is suitably used, and examples include fluoroalkyl group-containing compounds such as perfluoroalkyl group-containing compounds, polymers of olefin compounds containing fluorine atoms, and aromatic fluorine compounds such as fluorobenzene. From the viewpoint of releasability, fluoroalkyl group-containing compounds are preferable, and, in particular, perfluoroalkyl group-containing compounds are preferable. Moreover, compounds containing a long chain alkyl compound that will be described below can also be used as fluorine compounds.

Examples of perfluoroalkyl group-containing compounds include perfluoroalkyl group-containing (meth)acrylates and polymers thereof, such as perfluoroalkyl (meth)acrylate, perfluoroalkylmethyl (meth)acrylate, 2-perfluoroalkylethyl (meth)acrylate, 3-perfluoroalkylpropyl (meth)acrylate, 3-perfluoroalkyl-1-methylpropyl (meth)acrylate, and 3-perfluoroalkyl-2-propenyl (meth)acrylate; and perfluoroalkyl group-containing vinyl ethers and polymers thereof, such as perfluoroalkylmethyl vinyl ether, 2-perfluoroalkylethyl vinyl ether, 3-perfluoropropyl vinyl ether, 3-perfluoroalkyl-1-methylpropyl vinyl ether, and 3-perfluoroalkyl-2-propenyl vinyl ether. In view of heat resistance and contamination, a polymer is preferable. The polymer may be composed solely of a single compound or may be a polymer of a plurality of compounds.

From the viewpoint of releasability, the perfluoroalkyl group preferably has 3 to 11 carbon atoms. Moreover, it may be a polymer with a compound containing a long chain alkyl compound that will be described below. Also, from the viewpoint of adhesion to the substrate, it is also preferably a polymer with vinyl chloride.

Examples of the silicone compound include alkyl silicones such as dimethyl silicone and diethyl silicone, and phenyl silicones having a phenyl group such as methylphenyl silicones. Silicones having various functional groups are also usable, and examples include an ether group, a hydroxyl group, an amino group, an epoxy group, a carboxylic acid group, a halogen group such as fluorine, and a perfluoroalkyl group. As for other functional groups, silicones having a vinyl group and hydrogen silicones in which a hydrogen atom is directly bonded to a silicon atom are also commonly used, and both silicones may be used in combination as addition-type silicone (a type obtained by an addition reaction of a vinyl group and hydrogen silane).

Modified silicones such as acryl-grafted silicone, silicone-grafted acryl, amino-modified silicone, and perfluoroalkyl-modified silicone are also usable as silicone compounds. In view of heat resistance and contamination, a curable silicone resin is preferably used, and silicone resins of any curing reaction type are usable such as condensation curable, addition curable, and active energy ray curable types.

The wax refers to a wax selected from natural waxes, synthetic waxes, and waxes obtained by blending them.

Natural waxes are plant-based waxes, animal-based waxes, mineral-based waxes, and petroleum waxes. Examples of plant-based waxes include candelilla wax, carnauba wax, rice wax, wood wax, and jojoba oil. Examples of animal-based waxes include beeswax, lanolin, and whale wax. Examples of mineral-based waxes include montan wax, ozokerite, and ceresin. Examples of petroleum waxes include paraffin wax, microcrystalline wax, and petrolatum.

Examples of synthetic waxes include synthetic hydrocarbons, modified waxes, hydrogenated waxes, higher fatty acid esters, fatty acid amides, amines, imides, ester waxes, and ketones.

Specific examples of synthetic hydrocarbons include Fischer-Tropsch wax (also known as Sasol wax) and polyethylene wax, and, in addition, include the following polymers that are low molecular weight polymers (specifically, polymers having a number average molecular weight of 500 to 20000), i.e., polypropylene, ethylene-acrylic acid copolymer, polyethylene glycol, polypropylene glycol, and block or graft conjugates of polyethylene glycol and polypropylene glycol.

Specific examples of modified waxes include montan wax derivatives, paraffin wax derivatives, and microcrystalline wax derivatives. The derivatives here are compounds obtained by any of the purification, oxidation, esterification, and saponification treatments, or by a combination thereof.

Specific examples of hydrogenated waxes include hydrogenated castor oil and hydrogenated castor oil derivatives.

In particular, from the viewpoint of stabilizing blocking characteristics or the like, synthetic waxes are preferable as release agents in the functional layer, in particular a polyethylene wax is more preferable, and an oxidized polyethylene wax is more preferable. From the viewpoint of stabilization of blocking characteristics or the like and handleability, the number average molecular weight of the synthetic wax is usually 500 to 30000, preferably 1000 to 15000, and more preferably 2000 to 8000.

The lower limit of the content of the release agent in the functional layer is usually 0% by weight or more, preferably 3% by weight or more, more preferably 5% by weight or more, even more preferably 8% by weight or more, and particularly preferably 10% by weight or more. The upper limit is usually 80% by weight or less, preferably 70% by weight or less, more preferably 60% by weight or less, even more preferably 50% by weight or less, and particularly preferably 40% by weight or less. By using the release agent within the above range, there is a tendency that, while ensuring the fixability of an image forming substance or the like, peelability is increased, and the image forming substance can be easily peeled off and removed.

(Polymer)

In order to increase the fixability of an image forming substance or the like to the functional layer, facilitate formation of the functional layer, or increase wettability to the substrate film when the functional layer is provided by coating, the functional layer preferably contains a polymer (a polymer other than the above-described antistatic agent and release agent as well as the crosslinking agent described below).

A conventionally known polymer is usable as the polymer used in the functional layer. Specific examples of the polymer include an acrylic resin, a urethane resin, a polyester resin, polyvinyl (such as polyvinyl alcohol and a vinyl chloride vinyl acetate copolymer), polyalkylene glycol, polyalkylene imine, methylcellulose, hydroxycellulose, and starch. Among these, from the viewpoint of the enhancement of the appearance, adhesion to the substrate film, and stabilization of antistatic capabilities and release capabilities, an acrylic resin, a urethane resin, a polyester resin, and polyvinyl alcohol are preferable, an acrylic resin, a urethane resin, and a polyester resin are more preferable, and an acrylic resin and a urethane resin are even more preferable. From the viewpoint of stabilization of antistatic capabilities and release capabilities or stability in the state of a coating solution when forming the functional layer by coating, an acrylic resin and polyvinyl alcohol are preferable. In view of overall capability, an acrylic resin or a urethane resin is preferable, and an acrylic resin is particularly preferable.

The acrylic resin as the above polymer to be contained in the functional layer is a polymer composed of a polymerizable monomer including an acrylic or methacrylic monomer. It may be a homopolymer or a copolymer, or, moreover, a copolymer with a polymerizable monomer other than the acrylic and methacrylic monomers. Also included are copolymers of such polymers with other polymers (such as polyester and polyurethane). Examples include block copolymers and graft copolymers. Alternatively, also included is a polymer obtained by polymerizing a polymerizable monomer in a polyester solution or a polyester dispersion (a mixture of polymers in some cases). Similarly, a polymer obtained by polymerizing a polymerizable monomer in a polyurethane solution or a polyurethane dispersion (a mixture of polymers in some cases) is also included. Similarly, a polymer obtained by polymerizing a polymerizable monomer in another polymer solution or dispersion (a polymer mixture in some cases) is also included. Moreover, in order to further increase adhesion, a hydroxyl group or an amino group can be contained.

The polymerizable monomer is not particularly limited, and examples include various carboxyl group-containing monomers such as acrylic acid, methacrylic acid, crotonic acid, itaconic acid, fumaric acid, maleic acid, and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate, and monobutyl hydroxy itaconate; various (meth)acrylic acid esters such as methyl (meth)acrylate, ethyl (meth)acrylate, propyl (meth)acrylate, butyl (meth)acrylate, and lauryl (meth)acrylate; various nitrogen-containing compounds such as (meth)acrylamide, diacetone acrylamide, N-methylol acrylamide, and (meth)acrylonitrile; various styrene derivatives such as styrene, α-methylstyrene, divinylbenzene, and vinyltoluene; various vinyl esters such as vinyl propionate; various silicon-containing polymerizable monomers such as γ-methacryloxypropyltrimethoxysilane and vinyltrimethoxysilane; phosphorus-containing vinylic monomers; various vinyl halides such as vinyl chloride and vinylidene chloride; and various conjugated dienes such as butadiene.

The urethane resin as the above polymer to be contained in the functional layer is a polymer compound having a urethane bond within the molecule, and is usually prepared by reacting polyol and isocyanate. Examples of the polyol include polyester polyols, polycarbonate polyols, polyether polyols, polyolefin polyols, and acrylic polyols. One of these compounds may be used singly, or two or more may be used in combination.

Examples of the polyester polyols include those obtained by reacting polycarboxylic acids (such as malonic acid, succinic acid, glutaric acid, adipic acid, pimelic acid, suberic acid, sebacic acid, fumaric acid, maleic acid, terephthalic acid, and isophthalic acid) or acid anhydrides thereof with polyhydric alcohols (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyldialkanolamine, and lactonediol), and those having a derivative unit of a lactone compound such as polycaprolactone.

The polycarbonate polyols are obtained from polyhydric alcohols and carbonate compounds by a dealcoholization reaction. Examples of the polyhydric alcohols include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexanedimethanol, 1,7-heptanediol, 1,8-octanediol, 1,9-nonanediol, 1,10-decanediol, neopentyl glycol, 3-methyl-1,5-pentanediol, and 3,3-dimethylol heptane. Examples of the carbonate compounds include dimethyl carbonate, diethyl carbonate, diphenyl carbonate, and ethylene carbonate. Examples of polycarbonate-based polyols obtained from reactions thereof include poly(1,6-hexylene) carbonate and poly(3-methyl-1,5-pentylene) carbonate.

Examples of the polyether polyols include polyethylene glycol, polypropylene glycol, polyethylene propylene glycol, polytetramethylene ether glycol, and polyhexamethylene ether glycol.

In view of the compatibility of the functional layer with other components, the stabilization of antistatic capabilities and release capabilities, and the like, polyester polyols and polycarbonate polyols are more preferable among the above polyols.

Examples of the polyisocyanate compound used to obtain a urethane resin include aromatic diisocyanates such as tolylene diisocyanate, xylylene diisocyanate, methylene diphenyl diisocyanate, phenylene diisocyanate, naphthalene diisocyanate, and tolidine diisocyanate, aliphatic diisocyanates having an aromatic ring such as α,α,α',α'-tetramethylxylylene diisocyanate, aliphatic diisocyanates such as methylene diisocyanate, propylene diisocyanate, lysine diisocyanate, trimethylhexamethylene diisocyanate, and hexamethylene diisocyanate, and alicyclic diisocyanates such as cyclohexane diisocyanate, methylcyclohexane diisocyanate, isophorone diisocyanate, dicyclohexylmethane diisocyanate, isopropylidene dicyclohexyl diisocyanate. One of these may be used singly, or two or more may be used in combination.

When synthesizing a urethane resin, a chain extender may be used. The chain extender is not particularly limited as long as it has two or more active groups that react with an isocyanate group and, in general, a chain extender having two hydroxyl groups or amino groups can be mainly used.

Examples of the chain extender having two hydroxyl groups include glycols, e.g., aliphatic glycols such as ethylene glycol, propylene glycol, and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylene diamine, xylylene diamine, and diphenylmethane diamine, aliphatic diamines such as ethylenediamine, propylenediamine, hexanediamine, 2,2-dimethyl-1,3-propanediamine, 2-methyl-1,5-pentanediamine, trimethylhexanediamine, 2-butyl-2-ethyl-1,5-pentanediamine, 1,8-octanediamine, 1,9-nonanediamine, and 1,10-decanediamine, and alicyclic diamines such as 1-amino-3-aminomethyl-3,5,5-trimethylcyclohexane, dicyclohexylmethanediamine, isopropyritincyclohexyl-4,4'-diamine, 1,4-diaminocyclohexane, and 1,3-bisaminomethylcyclohexane.

A solvent may be used as a medium in the urethane resin. Preferably, water is used as a medium.

In order to disperse or dissolve the urethane resin in water, there are a forced emulsification type involving an emulsifier, a self-emulsification type or a water-soluble type introducing a hydrophilic group into the urethane resin, and the like. In particular, a self-emulsification type in which an ionic group is introduced into the structure of the urethane resin to form an ionomer is superior and preferable with respect to the storage stability of a liquid and the water resistance and transparency of the resulting functional layer.

Examples of the ionic group introduced at this time include a variety of ionic groups such as a carboxyl group, sulfonic acid, phosphoric acid, phosphonic acid, and a quaternary ammonium salt. As for a method for introducing a carboxyl group into the urethane resin, various methods can be used in the respective stages of a polymerization reaction. For example, a method in which a resin having a carboxyl group is used as a copolymerization component and a method in which a component having a carboxyl group is used as one component of a polyol, a polyisocyanate, a chain extender, or the like may be used during prepolymer synthesis. In particular, preferable is a method in which a carboxyl group-containing diol is used, and a desired amount of a carboxyl group is introduced according to the amount of the carboxyl group-containing diol introduced.

For example, dimethylolpropionic acid, dimethylolbutanoic acid, bis-(2-hydroxyethyl)propionic acid, bis-(2-hydroxyethyl)butanoic acid, or the like can be copolymerized with a diol used in the polymerization of the urethane resin. The carboxyl group is preferably formed into a salt by being neutralized with ammonia, an amine, an alkali metal, an inorganic alkali, or the like. Ammonia, trimethylamine, and triethylamine are particularly preferable. Concerning the urethane resin, the carboxyl group from which the neutralizing agent has been eliminated in the drying step after coating can be used as a point of crosslinking reaction with another crosslinking agent. Accordingly, the stability in a liquid state before coating is excellent, and, also, the durability, solvent resistance, water resistance, blocking resistance, and the like of the resulting functional layer can be further improved.

Examples of the main constituents of the polyester resin as the above polymer to be contained in the functional layer include those composed of polycarboxylic acids and polyvalent hydroxy compounds as follows. That is, as polycarboxylic acids, usable are terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, p-hydroxybenzoic acid, trimellitic acid monopotassium salt, ester forming derivatives thereof, and the like. As polyvalent hydroxy compounds, usable are ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylylene glycol, bisphenol A-ethylene glycol adducts, diethylene glycol, triethylene glycol, polyethylene glycol, polypropylene glycol, polytetramethylene glycol, polytetramethylene oxide glycol, dimethylol propionic acid, glycerin, trimethylolpropane, sodium dimethrolethylsulfonate, potassium dimethyrolpropionate, and the like. One or more are suitably selected from respective types of these compounds, and a polyester resin is synthesized by a polycondensation reaction in a conventional manner.

The polyvinyl alcohol as the above polymer to be contained in the functional layer has a polyvinyl alcohol moiety, and conventionally known polyvinyl alcohols are usable, including, for example, modified compounds obtained by partially modifying polyvinyl alcohols into acetals, butyrals, or the like. The degree of polymerization of the polyvinyl alcohol is not particularly limited, and usually a polyvinyl alcohol having a degree of polymerization of 100 or more and preferably in the range of 300 to 40000 is used. When the degree of polymerization is less than 100, the water resistance of the functional layer may be impaired. The degree of saponification of the polyvinyl alcohol is not particularly limited, and the polyvinyl alcohol is a polyvinyl acetate saponification product having a degree of saponification within the range of preferably 50 mol % or more, more preferably 70 to 99 mol %, even more preferably 80 to 98 mol %, and particularly preferably 86 to 97 mol %.

The lower limit of the content of the polymer in the functional layer is usually 0% by weight or more, preferably 3% by weight or more, more preferably 5% by weight or more, even more preferably 10% by weight or more, and particularly preferably 15% by weight or more. The upper limit is usually 80% by weight or less, preferably 70% by weight or less, more preferably 60% by weight or less, even more preferably 55% by weight or less, and particularly preferably 50% by weight or less. By using the polymer within the above range, there is a tendency that an excellent appearance is likely achieved due to the ease of forming an image forming substance, an increase of adhesion to the substrate film, and an increase of wettability to the substrate film when the functional layer is provided by coating.

(Crosslinking Agent)

The functional layer preferably further contains a crosslinking agent to increase the strength of the functional layer and to increase the fixability of an image forming substance or the like. At this time, the functional layer after being crosslinked contains a crosslinked structure derived from a crosslinking agent. That is, the functional layer containing a crosslinking agent means a functional layer formed by curing a coating solution containing a crosslinking agent.

Moreover, by containing a crosslinking agent in the functional layer, there is a tendency that the property of increasing the wettability to the substrate film can be imparted. From the research conducted by the present inventors, it was found that in the case where a polyester-incompatible polymer, or polyolefin in particular, is contained in the substrate polyester film, wettability may be poor and the coating solution may be repelled when providing the functional layer by coating. However, it was surprisingly found that the inclusion of a crosslinking in the functional layer greatly improves wettability.

A conventionally known material can be used as a crosslinking agent, and examples include oxazoline compounds, isocyanate-based compounds, epoxy compounds, melamine compounds, carbodiimide-based compounds, silane coupling compounds, hydrazide compounds, and aziridine compounds. Among these, oxazoline compounds, isocyanate-based compounds, epoxy compounds, melamine compounds, carbodiimide-based compounds, and silane coupling compounds are preferable. In order to further increase the strength of the functional layer, melamine compounds and oxazoline compounds are preferable, and in order to increase adhesion to the substrate film, oxazoline compounds, isocyanate-based compounds, epoxy compounds, and carbodiimide-based compounds are preferable, and, in particular, oxazoline compounds and isocyanate-based compounds are preferable.

The above-described materials can be used as crosslinking agents, and among them, oxazoline compounds, isocyanate-based compounds, epoxy compounds, and silane coupling compounds are preferable for increasing wettability. In particular, oxazoline compounds and isocyanate-based compounds are more preferable. That is, from the comprehensive viewpoint, the most preferable materials as crosslinking agents are oxazoline compounds or isocyanate-based compounds. One of these crosslinking agents may be used singly, or two or more may be used in combination.

The oxazoline compounds used as crosslinking agents are particularly preferably polymers containing an oxazoline group, and can be prepared by homopolymerizing an addition-polymerizable oxazoline group-containing monomer or copolymerizing it with another monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. One, or a mixture of two or more, of these can be used.

Among these, 2-isopropenyl-2-oxazoline is industrially readily available and thus suitable. The other monomer is not limited as long as it is a monomer copolymerizable with the addition-polymerizable oxazoline group-containing monomer, and examples include (meth)acrylic acid esters such as alkyl (meth)acrylates; unsaturated carboxylic acids such as acrylic acid, methacrylic acid, itaconic acid, maleic acid, fumaric acid, crotonic acid, and styrenesulfonic acid, and salts thereof (such as a sodium salt, a potassium salt, an ammonium salt, and a tertiary amine salt); unsaturated nitriles such as acrylonitrile and methacrylonitrile; unsaturated amides such as (meth)acrylamide, N-alkyl (meth)acrylamide, and N,N-dialkyl (meth)acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride, and vinyl fluoride; and α,β-unsaturated aromatic monomers such as styrene and α-methylstyrene. One or two or more of these monomers can be used. Examples of the alkyl include a methyl group, an ethyl group, a n-propyl group, an isopropyl group, a n-butyl group, an isobutyl group, a t-butyl group, a 2-ethylhexyl group, and a cyclohexyl group.

The isocyanate-based compounds used as crosslinking agents refer to compounds having an isocyanate derivative structure represented by isocyanate or block isocyanate. Examples of isocyanate include aromatic isocyanates such as tolylene diisocyanate, xylylene diisocyanate, methylene diphenyl diisocyanate, phenylene diisocyanate, and naphthalene diisocyanate; aliphatic isocyanates having an aromatic ring, such as α,α,α',α'-tetramethyl xylylene diisocyanate; aliphatic isocyanates such as methylene diisocyanate, propylene diisocyanate, lysine diisocyanate, trimethylhexamethylene diisocyanate, and hexamethylene diisocyanate; alicyclic isocyanates such as cyclohexane diisocyanate, methylcyclohexane diisocyanate, isophorone diisocyanate, methylenebis(4-cyclohexyl isocyanate), and isopropylidene dicyclohexyl diisocyanate.

Examples also include polymers and derivatives such as burettes, isocyanurates, uretidiones, and carbodiimide-modified products of these isocyanates. One of these may be used singly, or two or more may be used in combination. Among the above isocyanates, aliphatic or alicyclic isocyanates are more preferable than aromatic isocyanates in order to avoid yellowing resulting from ultraviolet light.

When using the crosslinking agent in the state of block isocyanate, examples of the blocking agents include bisulfites, phenol-based compounds such as phenol, cresol, and ethylphenol, alcohol-based compounds such as propylene glycol monomethyl ether, ethylene glycol, benzyl alcohol, methanol, and ethanol, active methylene-based compounds such as dimethyl malonate, diethyl malonate, methyl isobutanoylacetate, methyl acetoacetate, ethyl acetoacetate, and acetylacetone, mercaptan-based compounds such as butyl mercaptan and dodecyl mercaptan, lactam-based compounds such as ε-caprolactam and δ-valerolactam, amine-based compounds such as diphenyl aniline, aniline, and ethylene imine, acid amide compounds such as acetanilide and acetic acid amide, formaldehyde, and oxime-based compounds such as acetaldoxime, acetone oxime, methyl ethyl ketone oxime, and cyclohexanone oxime. One of these may be used singly, or two or more may be used in combination. Among those set forth above, an isocyanate compound blocked by an active methylene-based compound is preferable particularly from the viewpoint of adhesion to the substrate film and wettability to the substrate film.

The above isocyanate-based compound may be used singly, or may be used as a mixture or a bonded material formed with various polymers. In the sense of increasing the dispersibility and crosslinkability of the isocyanate-based compound, it is also preferable to use a mixture or a bonded material formed with a polyester resin or a urethane resin.

Examples of the epoxy compounds used as crosslinking agents include condensates of epichlorohydrin with a hydroxyl group of ethylene glycol, polyethylene glycol, glycerin, polyglycerin, bisphenol A, or the like, or with an amino group, such as polyepoxy compounds, diepoxy compounds, monoepoxy compounds, and glycidyl amine compounds. Examples of polyepoxy compounds include sorbitol polyglycidyl ether, polyglycerol polyglycidyl ether, pentaerythritol polyglycidyl ether, digylcerol polyglycidyl ether, triglycidyl tris(2-hydroxyethyl)isocyanate, glycerol polyglycidyl ether, and trimethylolpropane polyglycidyl ether; examples of diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether, and polytetramethylene glycol diglycidyl ether; examples of monoepoxy compounds include allyl glycidyl ether, 2-ethylhexyl glycidyl ether, and phenyl glycidyl ether; and examples of glycidyl amine compounds include N,N,N',N'-tetraglycidyl-m-xylylenediamine and 1,3-bis(N,N-diglycidylamino)cyclohexane.

The melamine compounds used as crosslinking agents refer to compounds having a melamine skeleton within the compounds, and, for example, alkylolated melamine derivatives, compounds partially or completely etherified by reacting alcohols with alkylolated melamine derivatives, and mixtures thereof are usable. As alcohols used in etherification, methyl alcohol, ethyl alcohol, isopropyl alcohol, n-butanol, isobutanol, and the like are suitably used. The melamine compounds may be either a monomer or a multimer that is at least a dimer, or may be a mixture thereof. In view of reactivity with various compounds, the melamine compounds preferably contain a hydroxyl group. Moreover, melamine compounds obtained by co-condensing a part of melamine with urea or the like are also usable, and a catalyst can also be used to increase the reactivity of the melamine compounds.

The carbodiimide-based compounds used as crosslinking agents refer to compounds having one or more carbodiimide or carbodiimide derivative structures within the molecule. For better strength and the like of the functional layer, a polycarbodiimide-based compound having two or more carbodiimide structures within the molecule is preferable.

The carbodiimide-based compounds used as crosslinking agents can be synthesized by a conventionally known technique, and a condensation reaction of a diisocyanate compound is commonly used. The diisocyanate compound is not particularly limited, and any of the aromatic and aliphatic diisocyanate compounds can be used. Specific examples include tolylene diisocyanate, xylene diisocyanate, diphenylmethane diisocyanate, phenylene diisocyanate, naphthalene diisocyanate, hexamethylene diisocyanate, trimethylhexamethylene diisocyanate, cyclohexane diisocyanate, methylcyclohexane diisocyanate, isophorone diisocyanate, dicyclohexyl diisocyanate, and dicyclohexylmethane diisocyanate.

Moreover, as long as the effects of the present invention are not lost, a surfactant may be added, or a quaternary ammonium salt of polyalkylene oxide or dialkylaminoalcohol or a hydrophilic monomer such as hydroxyalkylsulfonate may be added, in order to increase the water solubility and the water dispersibility of the polycarbodiimide-based compounds.

The silane coupling compounds used as crosslinking agents refer to organosilicon compounds having an organic functional group and a hydrolyzable group such as an alkoxy group within one molecule. Examples include epoxy group-containing compounds such as 3-glycidoxypropylmethyldimethoxysilane, 3-glycidoxypropyltrimethoxysilane, 3-glycidoxypropylmethyldiethoxysilane, 3-glycidoxypropyltriethoxysilane, and 2-(3,4-epoxycyclohexyl)ethyltrimethoxysilane; vinyl group-containing compounds such as vinyltrimethoxysilane and vinyltriethoxysilane; styryl group-containing compounds such as p-styryltrimethoxysilane and p-styryltriethoxysilane; (meth)acrylic group-containing compounds such as 3-(meth)acryloxypropyltrimethoxysilane, 3-(meth)acryloxypropyltriethoxysilane, 3-(meth)acryloxypropylmethyldimethoxysilane, and 3-(meth)acryloxypropylmethyldiethoxysilane; amino group-containing compounds such as 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-triethoxysilyl-N-(1,3-dimethylbutylidene)propylamine, N-phenyl-3-aminopropyltrimethoxysilane, and N-phenyl-3-aminopropyltriethoxysilane; isocyanurate group-containing compounds such as tris(trimethoxysilylpropyl) isocyanurate and tris(triethoxysilylpropyl) isocyanurate; and mercapto group-containing compounds such as 3-mercaptopropyltrimethoxysilane, 3-mercaptopropyltriethoxysilane, 3-mercaptopropylmethyldimethoxysilane, and 3-mercaptopropylmethyldiethoxysilane.

Among the above compounds, from the viewpoint of the strength of the functional layer and adhesion to the substrate film, epoxy group-containing silane coupling compounds, silane coupling compounds containing a double bond such as a vinyl group or a (meth)acrylic group, and amino group-containing silane coupling compounds are more preferable.

The crosslinking agent contained in the functional layer is usually present in a state of being reacted with the polymer or the crosslinking agent itself in the drying process or the film forming process. Therefore, in the functional layer of present laminated white film 1, the crosslinking agent is present as an unreacted crosslinking agent, a reacted compound, or a mixture thereof (a compound derived from the crosslinking agent).

The lower limit of the content of the crosslinking agent in the functional layer is usually 0% by weight or more, preferably 3% by weight or more, more preferably 5% by weight or more, even more preferably 8% by weight or more, and particularly preferably 10% by weight or more. The upper limit is usually 80% by weight or less, preferably 70% by weight or less, more preferably 60% by weight or less, even more preferably 50% by weight or less, and particularly preferably 40% by weight or less. By using the crosslinking agent within the above range, the strength of the functional layer can be increased, and, also, there is a tendency that an excellent appearance is likely achieved due to an increase of adhesion to the substrate film and an increase of wettability to the substrate film when the functional layer is provided by coating. Here, the content of the crosslinking agent means the proportion in non-volatile components in the source material (coating solution) before the crosslinking reaction, and also has the same meaning in the functional layer after the crosslinking reaction.

(Other Components)

As long as the gist of the present invention is not impaired, particles can be contained in the functional layer in order to improve blocking and smoothness. Moreover, an antifoaming agent, a coatability improver, a thickener, an organic lubricant, an ultraviolet absorber, an antioxidant, a foaming agent, and the like can be contained in the functional layer.

(Film Thickness of Functional Layer)

The film thickness of the functional layer is usually 0.001 to 3 μm, preferably 0.005 to 1 μm, more preferably 0.01 to 0.5 μm, even more preferably 0.02 to 0.3 μm, and most preferably 0.03 to 0.2 μm. By setting the film thickness of the functional layer to the above range, there is a tendency that good antistatic capabilities and release capabilities are easily achieved at the same time.

(Arrangement of Functional Layer)

The functional layer can be provided on one surface of the substrate polyester film or on both surfaces of the polyester film.

When the functional layer is provided on both surfaces, the film, both surfaces of which are usable as a recording material, can be formed, thereby having advantage in that, for example, the handleability of the film is improved. Thus, such a film is more preferable in terms of capability than a film provided with the functional layer on one surface. Also, providing the functional layer on both surfaces tends to improve curling resulting from environmental changes such as temperature and humidity changes.

(Antistatic Capabilities of Functional Layer)

The antistatic capabilities of the functional layer expressed by a surface resistance value are usually $1\times10^{13}\Omega$ or less, preferably $1\times10^{12}\Omega$ or less, more preferably $5\times10^{11}\Omega$ or less, even more preferably $1\times10^{11}\Omega$ or less, and particularly preferably $5\times10^{10}\Omega$ or less. When within the above range, there is a tendency that films are prevented from being adhered to each other, and a film effective for preventing adhesion of dust and the like is formed. Accordingly, when such a film is used as a recording material of copy paper and printer paper to which a toner image can be suitably transferred by a method such as an electrophotographic method or a thermal transfer method, it is possible to prevent feeding of multiple sheets during the paper feeding of a copier and a multifunctional device and prevent sheets from adhering to each other during the handling of sheets.

<Production Method for Present Laminated White Film 1>

Below, the method for producing present laminated white film 1 will now be specifically described. However, the present invention is not particularly limited to the following example as long as the gist of the present invention is satisfied.

First, a blended source material dried by a known method or undried is supplied to a melt extruder, heated to a temperature equal to or higher than the melting point of each polymer and melt-kneaded. Then, the molten polymer is directed to a die to prepare a molten sheet.

When producing a laminated polyester film having two or more layers, source materials blended for the respective layers are supplied to the respective melt extruders, and heated to a temperature equal to or higher than the melting point of each polymer and melt-kneaded. Then, the molten polymers of the respective layers are directed to a die usually through a multimanifold or feed block, and laminated.

Next, a molten sheet extruded from the die is quenched and solidified on a rotary cooling drum to a temperature equal to or below the glass transition temperature to obtain a substantially amorphous unoriented sheet. In this case, in order to increase the planarity of the sheet, it is preferable to increase adhesion between the sheet and the rotary cooling drum, and an electrostatic pinning method and/or a liquid coating adhesion method is preferably employed.

The sheet obtained as described above is stretched to form a film. Fine independent voids contained in the polyester film are created by such stretching.

As for specific stretching conditions, the unstretched sheet is stretched 2.5- to 5-fold at 70 to 150° C. preferably in the longitudinal direction (lengthwise direction) to obtain a longitudinally uniaxially stretched film. The longitudinally uniaxially stretched film is stretched 3- to 5-fold at 70 to 160° C. in the width direction (transverse direction) and is preferably heat-treated usually for 5 to 600 seconds and preferably for 8 to 300 seconds in the range of usually 200 to 250° C., preferably 210 to 240° C., and more preferably 215 to 240° C.

Regulating the heat treatment temperature to be within such a temperature range makes it possible to regulate the melt viscosity of the polyester-incompatible polymer and regulate the roughness of the film surface.

The conditions of the heat treatment step affect not only the heat shrinkage of the film but also the arithmetic mean roughness (Ra) of the film surface. That is, at a high temperature within the above range, fine voids formed by the polyester-incompatible polymer present in the surface or in the surface layer in the case of a laminated structure are dissolved. Appropriately reducing the surface roughness makes it possible to easily peel off and remove characters and images formed on the film surface by printing. Accordingly, the film can be repeatedly used as a recording material of copy paper and printer paper.

After the heat treatment step, a method involving relaxing by 2 to 20% in the longitudinal direction and/or the transverse direction in the maximum temperature zone of heat treatment and/or the cooling zone at the heat treatment outlet is preferable. Longitudinal stretching and transverse stretching can be performed again as necessary.

(Method for Forming Functional Layer)

A functional layer is laminated on at least one surface of the polyester film obtained by the above-described production method.

The functional layer can be provided by known various methods such as a coating method, a co-extrusion method, and a transfer method. Among them, a coating method is preferable from the viewpoint of efficient production and capability provision.

In the coating method, conventionally known coating procedures can be used, such as gravure coating, reverse roll coating, die coating, air doctor coating, blade coating, rod coating, bar coating, curtain coating, knife coating, transfer roll coating, squeeze coating, impregnation coating, kiss coating, spray coating, calender coating, and extrusion coating.

The functional layer may be provided by in-line coating in which the film surface is treated during the film forming process of the polyester film, or off-line coating may be employed in which the film once produced is coated with the functional layer outside the system. In particular, the functional layer formed by in-line coating is more preferable.

In-line coating is a method in which coating is performed during the process of producing the polyester film, and specifically a method in which coating is performed at any stage from melt-extrusion of polyester to taking-up after post-stretching heat setting. Usually, coating is performed on any of the unstretched sheet obtained by melting and quenching, the uniaxially stretched film, the biaxially stretched film before heat setting, and the film before taking-up after heat setting. Although the method is not limited to the following, for example, in the sequential biaxial stretching, a method is particularly advantageous in which a uniaxially stretched film stretched in the longitudinal direction (lengthwise direction) is coated and then stretched in the width direction (transverse direction). Such a method enables film formation and functional layer formation to be simultaneously performed and is thus advantageous with respect to production cost, and also it involves stretching after coating and thus can change the thickness of the functional layer according to the stretch ratio, thereby enabling thin film coating to be performed more easily than off-line coating. By providing the functional layer on the film before stretching, the functional layer can be stretched together with the substrate film, thereby enabling the functional layer to be firmly adhered to the substrate film.

Moreover, in the production of a biaxially stretched polyester film, by stretching the film while holding the film edge with clips or the like, the film can be secured in the longitudinal and transverse directions, and, thus, in the heat setting process, a high temperature can be applied while maintaining the planarity without creating wrinkles and the like. Accordingly, in-line coating enables heat treatment, which is performed after application, to be performed at a high temperature that cannot be achieved by other methods, thus the film formability of the functional layer is increased, the functional layer and the substrate film can be more firmly adhered to each other, moreover a strong functional layer can be formed, thus the detachment of the functional layer is prevented, and the antistatic capabilities and the release capabilities can be increased. Also, when forming the functional layer using a source material (coating solution) containing a crosslinking agent, a crosslinking reaction can be performed by high temperature during heat setting.

As for the method for forming the functional layer, a laminated white film is preferably produced such that a solution or a solvent dispersion of a series of the above-described compounds regulated to a solids concentration of about 0.1 to 80% by weight is applied to a polyester film. In particular, when providing the functional layer by in-line coating, an aqueous solution or aqueous dispersion is more preferable. In order to improve dispersibility in water, improve film formability, and the like, the coating solution may contain a small amount of an organic solvent. One organic solvent may be used singly, or two or more may be used in combination.

The drying and curing conditions when forming the functional layer are not particularly limited. In the case of a method involving coating, the drying temperature of a solvent such as water used in the coating solution is usually 70 to 150° C., preferably 80 to 130° C., and more preferably 90 to 120° C. As a rough guide, the drying time is 3 to 200 seconds and preferably 5 to 120 seconds.

In order to increase the strength of the functional layer, a heat treatment step in the range of usually 150 to 270° C., preferably 170 to 250° C., and more preferably 180 to 240° C. is preferably performed during the film production process. As a rough guide, the time of the heat treatment step is 5 to 600 seconds and preferably 8 to 300 seconds.

As necessary, heat treatment and active energy ray irradiation such as ultraviolet irradiation may be used in combination. The polyester film constituting present laminated white film 1 may be subjected to surface treatment such as corona treatment or plasma treatment in advance.

<Image Forming Substance or the Like>

Characters and images containing a thermoplastic resin of an image forming substance or the like can be provided on the functional layer of present laminated white film 1.

Here, characters and images can be provided by a conventionally known method, and can be obtained by printing with a copier or a printer.

On the other hand, a conventionally known material can also be used as the thermoplastic resin used in the image forming substance or the like.

The image forming substance is not limited. That is, the above "image forming substance or the like" generally includes all substances capable of forming an image on a recording material, and may be in any form such as solid particles, a suspension, or a solution, including ink.

Also, the colorant is not limited, and any of the pigment, dye, colored compound, and the like can be used. In particular, toner obtained by dispersing pigment as fine particles in a thermoplastic resin is preferable.

<Resin Layer>

In present laminated white film 1, a resin layer can further be provided on the image forming substance or the like or on the functional layer.

The primary purpose of providing the resin layer may be to peel off and remove characters and images together with the resin layer from the film to, for example, reuse the laminated white film.

A conventionally known material can be used as the resin layer, and a curable resin layer formed of a curable resin composition is preferable.

Examples of the curable resin layer include a thermosetting resin layer composed of a resin composition that is cured by being heated, and an active energy ray curable resin layer composed of a resin composition that is cured by being irradiated with active energy rays. In particular, the active energy ray curable resin layer is preferable from the viewpoint of easily peeling off and remove characters and images completely.

Examples of the active energy ray curable resin layer include an ultraviolet ray curable resin layer, an electron beam curable resin layer, and a visible light curable resin layer. The ultraviolet ray curable resin layer is preferable in view of the ease of handling and curability. An example of the active energy ray curable resin layer is a hard-coat layer.

The material used in the active energy ray curable resin layer is not particularly limited. Examples include cured products of monofunctional (meth)acrylates, polyfunctional (meth)acrylates, and reactive silicon compounds such as tetraethoxysilane. Among these, from the viewpoint of simultaneously achieving productivity and hardness, a polymerized cured product of a composition containing an active energy ray curable (meth)acrylate is particularly preferable. Moreover, when the resin layer is provided to peel off and remove an image from a laminated white film, the above materials tend to be capable of exerting favorable peeling and removing properties.

The composition containing an active energy ray curable (meth)acrylate is not particularly limited. For example, usable are a mixture of one or more known monofunctional (meth)acrylates, difunctional (meth)acrylates and polyfunctional (meth)acrylates, those commercially available as active energy ray curable hard coat resin materials, and those obtained by further adding, besides these components, other components as long as the object of the present embodiment is not impaired.

The active energy ray curable monofunctional (meth) acrylates are not particularly limited. Examples include alkyl (meth)acrylates such as methyl (meth)acrylate, n-butyl (meth)acrylate, 2-ethylhexyl (meth)acrylate, lauryl (meth) acrylate, stearyl (meth)acrylate, cyclohexyl (meth)acrylate, and isobornyl (meth)acrylate, hydroxyalkyl (meth)acrylates such as hydroxyethyl (meth)acrylate, hydroxypropyl (meth) acrylate, and hydroxybutyl (meth)acrylate, alkoxyalkyl (meth)acrylates such as methoxyethyl (meth)acrylate, ethoxyethyl (meth)acrylate, methoxypropyl (meth)acrylate, and ethoxypropyl (meth)acrylate, aromatic (meth)acrylates such as benzyl (meth)acrylate, phenoxyethyl (meth)acrylate, and phenoxypropyl (meth)acrylate, amino group-containing (meth)acrylates such as diaminoethyl (meth)acrylate and diethylaminoethyl (meth)acrylate, methoxy ethylene glycol (meth)acrylate, phenoxy polyethylene glycol (meth)acrylate, ethylene oxide-modified (meth)acrylates such as phenylphenol ethylene oxide-modified (meth)acrylate, glycidyl (meth)acrylate, tetrahydrofurfuryl (meth)acrylate, and (meth)acrylic acid.

The active energy ray curable difunctional (meth)acrylates are not particularly limited. Examples include alkanediol di(meth)acrylates such as 1,4-butanediol di(meth)acrylate, neopentyl glycol di(meth)acrylate, 1,6-hexanediol di(meth)acrylate, 1,9-nonanediol di(meth)acrylate, and tricyclodecane dimethylol di(meth)acrylate, bisphenol-modified di(meth)acrylates such as bisphenol A ethylene oxide-modified di(meth)acrylates and bisphenol F ethylene oxide-modified di(meth)acrylates, polyethylene glycol di(meth)acrylate, polypropylene glycol di(meth)acrylate, urethane di(meth)acrylate, and epoxy di(meth)acrylate.

The active energy ray curable polyfunctional (meth)acrylates are not particularly limited, and examples include dipentaerythritol hexa(meth)acrylate, pentaerythritol tetra(meth)acrylate, ditrimethylolpropane tetra(meth)acrylate, pentaerythritol tri(meth)acrylate, trimethylolpropane tri(meth)acrylate, isocyanuric acid-modified tri(meth)acrylates such as isocyanuric acid ethylene oxide-modified tri(meth)acrylate and ε-caprolactone-modified tris(acroxyethyl) isocyanurate, and urethane acrylates such as pentaerythritol triacrylate hexamethylene diisocyanate urethane prepolymer, pentaerythritol triacrylate toluene diisocyanate urethane prepolymer, and dipentaerythritol pentaacrylate hexamethylene diisocyanate urethane prepolymer.

Other components contained in the composition containing an active energy ray curable (meth)acrylate are not particularly limited. Examples include inorganic or organic fine particles, a polymerization initiator, a polymerization inhibitor, an antioxidant, an antistatic agent, a dispersant, a surfactant, a light stabilizer, and a leveling agent. When drying is performed after film formation by a wet-coating method, any amount of a solvent can be added.

When the resin layer is provided to peel off and remove characters and images from the laminated white film, the process of peeling off and removing is usually performed not in a factory where the film is produced, but in an office or the like. Accordingly, for in-door use such as in an office, a solvent is preferably not contained. The solvent content in a resin (resin solution) for forming the resin layer is preferably 10% by weight or less, more preferably 5% by weight or less, even more preferably 3% by weight or less, and particularly preferably 1% by weight or less, and most preferably the solvent is not contained (not intentionally contained).

Examples of the method for forming the resin layer include commonly used wet coating methods such as a roll coating method and a die coating method, and an extrusion method. The formed resin layer can be subjected to a curing reaction by being heated or irradiated with active energy rays such as ultraviolet rays and electron beams as necessary.

Second Embodiment

As an example of the second embodiment for carrying out the present invention, laminated white polyester film (which will be also referred to as a "laminated white film") 10 will now be described.
<Present Laminated White Polyester Film 10>

As an exemplary mode of carrying out the present invention, the laminated white polyester film 10 (which will be referred to as a "present laminated white polyester film 10") is a laminated film having at least two layers containing polyester as a main component resin, and at least the surface layer thereof is characterized by containing polyester and a polymer that is incompatible with the polyester.
<Laminated Configuration>

The present laminated white polyester film 10 may have multiple layers composed of two, three, four, or more layers as long as the gist of the present invention is not exceeded, and the layer configuration is not particularly limited. In particular, the polyester film is preferably a three-layer configuration composed of two surface layers and an intermediate layer (surface layer/intermediate layer/surface layer).

A two-layer laminated configuration means that the film is composed of two surface layers, and, a specific example may be a configuration in which the film is formed of two layers wherein the type of polyester constituting each layer or the formulation of the contained particles or the like is different.
<Surface Layer>

The surface layer of the present laminated white polyester film 10 preferably contains at least polyester as a main component resin and a polymer that is incompatible with polyester.

Here, the "main component resin" means a resin that is contained in the largest proportion among the resin components constituting the surface layer. The main component resin may account for 30% by mass or more, in particular 50% by mass or more, and in particular 80% by mass or more (including 100% by mass) of the resin components constituting the surface layer.
(Polyester)

Polyester constituting the present laminated white polyester film 10 is the same as the polyester film as the substrate in the present laminated white film 1 above or polyester as the main component resin of the polyester resin layer.
(Polyester-Incompatible Polymer)

By causing the polyester-incompatible polymer to be contained in the present laminated white polyester film 10, numerous fine voids can be created in an at least uniaxially stretched polyester film. The fine voids not only can cause the present laminated white polyester film 10 to scatter light and provide white opacity but also can reduce the apparent density of the present laminated white polyester film 10.

By causing a polyester-incompatible polymer to be contained in the surface layer of the present laminated white polyester film 10 in particular, the present laminated white polyester film 10 when used as a recording material of copy paper and printer paper facilitates an image forming substance containing a thermoplastic resin, such as toner, printed onto the surface of the present laminated white polyester film 10 to be peeled off and removed. In order to ensure sufficient masking properties and weight reduction, the polyester-incompatible polymer may be contained in the intermediate layer as necessary.

The polyester-incompatible polymer is also the same as the "polyester-incompatible polymer" described with respect to present laminated white film 1 above.

The lower limit of the content of the "polyester-incompatible polymer" in the surface layer of the present laminated white polyester film 10 is usually 1% by weight or more, preferably 2% by weight or more, more preferably 3% by weight or more, even more preferably 5% by weight or more, and particularly preferably 8% by weight or more. By using the polyester-incompatible polymer within the above range, a sufficient amount of fine voids is created in the film, thus the masking properties of the film are increased, and the apparent-density reducing effect, i.e., weight reduction, is sufficient. Also, film smoothness and writeability with a pencil or the like are also increased, and the film is also advantageous with respect to print feedability. Moreover, there is a tendency that characters and images made of the printed image forming substance or the like are easily peeled off and removed from the film surface, and thus the film can be repeatedly used as a recording material of copy paper and printer paper.

On the other hand, the upper limit of the content of the polyester-incompatible polymer in the surface layer is usually 70% by weight or less, preferably 50% by weight or less, more preferably 40% by weight or less, even more preferably 35% by weight or less, particularly preferably 30% by weight or less, and most preferably 25% by weight or less. When the polyester-incompatible polymer is used in a content within the above range, there is a tendency that the amount of created voids is not excessive, and breaking during stretching is likely suppressed.

The lower limit of the content of the "polyester-incompatible polymer" in each layer of the present laminated white polyester film 10 is usually 1% by weight or more, preferably 2% by weight or more, more preferably 3% by weight or more, even more preferably 5% by weight or more, and particularly preferably 8% by weight or more. By using the polyester-incompatible polymer within the above range, sufficient masking properties are provided, and the apparent-density reducing effect, i.e., weight reduction, is sufficient.

On the other hand, the upper limit of the content of the polyester-incompatible polymer in each layer of the present laminated white polyester film 10 is usually 70% by weight or less, preferably 50% by weight or less, more preferably 40% by weight or less, even more preferably 35% by weight or less, particularly preferably 30% by weight or less, and most preferably 25% by weight or less. When the polyester-incompatible polymer is used in a content within the above range, there is a tendency that the amount of created voids is not excessive, and breaking during stretching is likely suppressed.

When the present laminated white polyester film 10 is formed of three or more layers, the intermediate layer may contain a recycled article such as an outside edge, a master roll outside edge, and a master roll inner wound part generated during film production, as long as the gist of the present invention is not impaired. The use of a recycled article has the effect of reducing cost and environmental burden. From the viewpoint of color regulation and, also, film formation stability resulting from lowered intrinsic viscosity, the content of a recycled article in the intermediate layer is preferably 95% by weight or less, more preferably 85% by weight or less, even more preferably 70% by weight or less, particularly preferably 60% by weight or less, and most preferably 40% by weight or less based on the intermediate layer.

(Metal Compound Particles)

Metal compound particles can be contained in the present laminated white polyester film 10 to further increase the masking properties and whiteness. When the polyester film is formed of three or more layers, the layer containing the metal compound particles may be a surface layer or an intermediate layer. In order to effectively increase masking properties and whiteness, the metal compound particles are preferably contained in the surface layer.

The metal compound particles used in the present laminated white polyester film 10 tend to supplement white opacity resulting from the light scattering effect provided by fine voids formed by blending the incompatible polymer, and thus there is a tendency that greater masking properties and whiteness are obtained.

At this time, the metal compound particles are the same as the metal compound particles described with respect to present laminated white film 1 above.

The lower limit of the content of the metal compound particles is preferably 1% by weight or more, more preferably 2% by weight or more, and even more preferably 3% by weight or more, and the upper limit is usually 30% by weight or less, preferably 20% by weight or less, more preferably 15% by weight or less, even more preferably 13% by weight or less, and particularly preferably 10% by weight or less, based on the entirety of the surface layer of the present laminated white polyester film 10 containing the metal compound particles. By setting the content to the above range, sufficient masking properties can be imparted, and moreover the polyester film tends to be cost-advantageous and optimally usable as a recording material of copy paper and printer paper in place of a sheet made of paper.

(Particles Other than Metal Compound Particles)

In order to increase the handleability and smoothness of the present laminated white polyester film 10, the surface layer of the present laminated white polyester film 10 in particular may contain particles other than the metal compound particles exemplified above.

At this time, particles other than the metal compound particles are the same as the "particles other than the metal compound particles" described with respect to present laminated white film 1 above.

(Other Components)

In addition to the above-described particles and polyester-incompatible polymer, a conventionally known antioxidant, heat stabilizer, lubricant, antistatic agent, fluorescent whitening agent, dye, pigment, and the like can be added to the present laminated white polyester film 10 as necessary. Depending on the application, an ultraviolet absorber, a benzoxazinone ultraviolet absorber in particular, or the like may be contained.

<Laminated Configuration>

The present laminated white polyester film 10 is a laminated film having at least two or more layers wherein polyester is the main component resin as described above, and at least the surface layer thereof preferably contains polyester and a polymer that is incompatible with the polyester and has an arithmetic mean roughness (Ra) of 950 nm or less.

Fine voids can be created by stretching the film when the surface layer contains polyester and a polymer that is incompatible with the polyester as described above, thus weight reduction, masking properties, and whitening can be achieved, moreover, the surface roughness can be regulated, and thus writeability can be increased.

When the surface layer further contains metal compound particles, the masking properties and whiteness can be further increased, and by further containing particles other than the metal compound particles, smoothness can be increased.

As long as the above polyester is contained, the intermediate layer other than the surface layers may contain a polymer that is incompatible with the polyester, metal compound particles, and particles other than the metal compound particles, as necessary. It is preferable from the viewpoint of cost reduction and environmental load reduction to minimize the content of metal compound particles and the content of particles other than the metal compound particles and to use recycled polyester.

<Thickness>

The thickness of the present laminated white polyester film 10 is not particularly limited as long as it enables film formation. The thickness is preferably 10 to 1000 μm, more preferably 20 to 500 μm, even more preferably 30 to 400 μm, and particularly preferably 38 to 350 μm. The use of the polyester film within the above range enables sufficient tautness and handleability of the film to be attained.

Concerning the present laminated white polyester film 10, the metal compound particles and the particles other than the metal compound particles are preferably contained in the surface layer.

The intermediate layer is preferably provided in the laminated structure using a co-extrusion method in order to achieve cost reduction and environmental load reduction by blending a recycled article.

From such a viewpoint, when the polyester film has a laminated configuration of three or more layers as described above, the thickness of each surface layer is preferably 1 μm to 50 μm, more preferably 2 μm or more and 40 μm or less, even more preferably 3 μm or more and 30 μm or less, and particularly preferably 4 μm or more and 25 μm or less. The use of the polyester film within the above range enables capabilities of the metal compound particles and particles other than the metal compound particles, which will be described below, to be sufficiently exerted, and the production cost to be kept low.

<Apparent Density>

The lower limit of the apparent density of the present laminated white polyester film 10 is usually 0.7 $g/cm^3$ or more, preferably 0.75 $g/cm^3$ or more, and more preferably 0.8 $g/cm^3$ or more. By setting the lower limit of the apparent density to the above range, the film strength can be maintained, film jam during the process of feeding the film in a copier can be reduced when the film is used as a recording material that is an information printing medium in place of paper such as copy paper or printer paper, and optimal printing can be performed.

On the other hand, the upper limit is usually 1.3 $g/cm^3$ or less, preferably 1.2 $g/cm^3$ or less, and more preferably 1.1 $g/cm^3$ or less. Setting the upper limit to the above range reduces workload when carrying a large amount of printed matter, moreover, enables the reduction of environmental load due to the reduction of $CO_2$ produced during the course of transporting the film (sheet) and the reduction of cost.

The apparent density of the polyester film can be regulated by blending an incompatible polymer having a specific gravity smaller than that of polyester that is the main component resin and stretching the film at least uniaxially. However, the present invention is not limited to such methods.

<Physical Properties>

The arithmetic mean roughness (Ra) of the surface, i.e., the surface layer, of the present laminated white polyester film 10 is preferably 950 nm or less, in particular 850 nm or less, and more preferably 800 nm or less. By using the polyester film having an arithmetic mean roughness (Ra) within the above range, there is a tendency that characters and images made of an image forming substance or the like containing a thermoplastic resin formed on the film surface by printing can be easily peeled off and removed, and the film can be repeatedly used as a recording material of copy paper and printer paper.

On the other hand, the lower limit of the arithmetic mean roughness (Ra) is preferably 100 nm or more, more preferably 200 nm or more, even more preferably 300 nm or more, and particularly preferably 350 nm or more. By setting the arithmetic mean roughness (Ra) to the above range, sufficient masking properties and feedability can be provided, and a film optimally used as a recording material of copy paper and printer paper can be provided. Moreover, there is a tendency that the polyester film has sufficient writeability.

The arithmetic mean roughness (Ra) in the present invention is based on the measurement method used in the Examples described below.

The b value (a reflection method), which is an index representing the yellowness of the present laminated white polyester film 10, is usually 0.00 or less, preferably −0.20 or less, more preferably −0.40 or less, even more preferably −0.50 or less, and particularly preferably −0.60 or less. The lower limit is not particularly limited, and is preferably −5.0 or more. By using the polyester film within the above range, yellowness is suppressed, and favorable whiteness can be attained. Moreover, when the polyester film is used as a recording material for color printing, the resulting image tends to have an excellent quality.

The heat shrinkage of the present laminated white polyester film 10 in the film longitudinal direction (MD) and the film width direction (TD) at 150° C. for 30 minutes is usually 2.8% or less, preferably 2.3% or less, and more preferably 2.0% or less as an absolute value.

When the heat shrinkage is within the above range, the dimensional stability of the film can be prevented from being thermally impaired when printing is performed on a recording material by a method such as an electrophotographic method or a thermal transfer method. In particular, even at the edge part of the film (sheet), i.e., a part where wrinkles are likely to be formed, wrinkles can be suppressed, and the phenomenon of image quality deterioration resulting from distortion or unevenness of characters and images can be suppressed. It is preferable not to allow wrinkles to be formed as much as possible because wrinkles cannot be eliminated once they are formed, and make it impossible to repeatedly use the polyester film as a recording material of copy paper and printer paper.

The masking properties (OD) of the present laminated white polyester film 10 are usually 0.30 or more, preferably 0.35 or more, more preferably 0.40 or more, and even more preferably 0.45 or more when a single film is measured by a Macbeth densitometer. By using the polyester film within the above range, the offset is reduced when both surfaces of the film are entirely printed, and high-quality characters and images can be obtained. On the other hand, the upper limit of the masking properties (OD) is not particularly limited, and is preferably 1.0 or less and more preferably 0.9 or less in view of the balance between the masking properties and other physical properties.

The lower limit of the whiteness of the present laminated white polyester film 10 is usually 80.0% or more, preferably 81.0% or more, more preferably 82.0% or more, even more preferably 83.0% or more, and particularly preferably 83.5% or more when the Hunter whiteness (Wb) of a single film is measured by a colorimeter. By setting the whiteness to the above range, there is a tendency that characters and images have high definition and are preferable in terms of quality, for example, when the polyester film is used as a recording material of copy paper and printer paper which is an information printing medium in place of paper, and especially when color printing is performed. Depending on the application in which the polyester film is used, a greater whiteness is more preferable to provide a sense of luxury, but the upper limit is not particularly limited. On the other hand, when the polyester film is used in an application where there is a concern about gloss, a preferable upper limit range is 95.0% or less.

<Functional Layer>

A functional layer may be provided on at least one surface of the present laminated white polyester film 10.

This functional layer can play, for example, a role of a recording layer, to the layer surface of which the image forming substance is directly attached. The recording layer in the present invention is a layer that plays a role of not only fixing the attached image forming substance, but also allowing the image forming substance to be removed together with a resin layer, which will be described below, when the resin layer is provided.

The functional layer preferably has antistatic capabilities and release capabilities.

The present laminated white polyester film 10 preferably has a polyester resin layer containing polyester and a polyester-incompatible polymer and more preferably has the polyester resin layer as a surface layer, in order to achieve a reduced apparent density, whitening without incurring cost, and easily peeling off and removing characters and images of a printed image forming substance or the like containing a thermoplastic resin. However, it has been found that when a functional layer is provided, it may be difficult in some cases to exert the capability of easily peeling off and removing characters and images of an image forming substance or the like on the surface layer, and thus the functional layer preferably has release capabilities. That is, the functional layer preferably contains a release agent to provide release capabilities such that a character/image forming substance, such as toner, containing a thermoplastic resin formed on the film surface can be suitably peeled off and removed after printing.

An object of present laminated white polyester film 10 when used as a recording material of copy paper and printer paper to which a toner image can be suitably transferred by a method such as an electrophotographic method or a thermal transfer method is to prevent feeding of multiple sheets during the paper feeding of a copier and a multifunctional device, prevent sheets from adhering to each other during the handling of sheets, and the like. Moreover, in order to prevent attachment of dust and provide a film having good quality and a printed film having good image quality, the functional layer preferably has antistatic capabilities.

From such viewpoints, the film preferably has, on at least one surface, a functional layer containing an antistatic agent.

In order to facilitate formation of an image forming substance, increase the fixability, and increase wettability to the substrate film when the functional layer is provided by coating, the functional layer more preferably contains a polymer (a polymer other than the above-described antistatic agent and release agent).

It has been found that by imparting appropriate release capabilities to the functional layer by causing the antistatic agent, the release agent, and the polymer to be contained, the function to fix an image forming substance or the like to the film surface and the function to peel off and remove the image forming substance or the like can be more suitably obtained. That is, a method has been found that achieves the mutually contradictory characteristics of fixability and peelability with a single functional layer at a higher level. It can be said that this technology is an extremely effective technology, considering that the peeling capabilities cannot be achieved by a commonly used functional layer having fixing capabilities while the fixing capabilities cannot be achieved by a commonly used functional layer having peeling capabilities. Even when a functional layer having fixing capabilities and a functional layer having peeling capabilities are laminated, neither of their capabilities can be exerted, and only the capabilities of the functional layer disposed as the outermost layer are reflected.

The antistatic agent, the release agent, and the polymer used in the present laminated white polyester film 10 are the same as the antistatic agent, the release agent, and the polymer used in the present laminated white film 1 above.

When the present laminated polyester film has the functional layer as well, preferable ranges of the b value, heat shrinkage, masking properties (OD), and whiteness of the present laminated polyester film are the same as the above numerical ranges.

<Production Method>

Below, the method for producing the present laminated white polyester film 10 will now be specifically described. The present invention is not particularly limited to the following example as long as the gist of the present invention is satisfied.

First, a source material blended for each layer and dried by a known method or undried is supplied to a melt extruder, heated to a temperature equal to or higher than the melting point of each polymer and melt-kneaded. Then, the molten polymers of the respective layers are directed to a die usually through a multimanifold or feed block, and laminated.

Next, a molten sheet extruded from the die is quenched and solidified on a rotary cooling drum to a temperature equal to or below the glass transition temperature to obtain a substantially amorphous unoriented sheet. In this case, in order to increase the planarity of the sheet, it is preferable to increase adhesion between the sheet and the rotary cooling drum, and an electrostatic pinning method and/or a liquid coating adhesion method is preferably employed.

The sheet obtained as described above is stretched to form a film. Fine independent voids contained in the polyester film are created by such stretching.

As for specific stretching conditions, the unstretched sheet is stretched 2.5- to 5-fold at 70 to 150° C. preferably in the longitudinal direction (lengthwise direction) to obtain a longitudinally uniaxially stretched film, then stretched 3- to 5-fold at 70 to 160° C. in the width direction (transverse direction) and is preferably heat-treated usually for 5 to 600 seconds and preferably for 8 to 300 seconds in the range of usually 200 to 250° C., preferably 210 to 240° C., and more preferably 215 to 240° C.

The conditions of the heat treatment step affect not only the heat shrinkage of the film but also the arithmetic mean roughness (Ra) of the surface layer of the film. That is, at a high temperature within the above range, fine voids formed by the polyester-incompatible polymer present in the surface of the surface layer are dissolved. Appropriately reducing the surface roughness makes it possible to easily peel off and remove characters and images of an image forming substance or the like containing a thermoplastic resin formed on the film surface by printing. Accordingly, the film can be repeatedly used as a recording material of copy paper and printer paper.

After the heat treatment step, a method involving relaxing by 2 to 20% in the longitudinal direction and/or the transverse direction in the maximum temperature zone of heat treatment and/or the cooling zone at the heat treatment outlet is preferable. Longitudinal stretching and transverse stretching can be performed again as necessary.

A method for forming a functional layer in the present laminated white polyester film 10 will now be described below. The functional layer can be provided by known various methods such as a coating method, a co-extrusion method, and a transfer method. Among them, a coating method is preferable from the viewpoint of efficient production and capability provision.

As for the coating method, in-line coating in which the film surface is treated during the film forming process of the polyester film, or off-line coating may be employed in which the film once produced is coated with the functional layer outside the system. More preferably, the functional layer is formed by in-line coating.

In-line coating is a method in which coating is performed during the process of producing the polyester film, and specifically a method in which coating is performed at any stage from melt-extrusion of polyester to taking-up after post-stretching heat setting. Usually, coating is performed on any of the unstretched sheet obtained by melting and quenching, the uniaxially stretched film, the biaxially stretched film before heat setting, and the film before taking-up after heat setting. Although the method is not limited to the following, for example, in the sequential biaxial stretching, a method is particularly advantageous in which a uniaxially stretched film stretched in the longitudinal direction (lengthwise direction) is coated and then stretched in the transverse direction. Such a method enables film formation and functional layer formation to be simultaneously performed and is thus advantageous with respect to production cost, and also it involves stretching after coating and thus can change the thickness of the functional layer according to the stretch ratio, thereby enabling thin film coating to be performed more easily than off-line coating. By providing the functional layer on the film before stretching, the functional layer can be stretched together with the substrate film, thereby enabling the functional layer to be firmly adhered to the substrate film. Moreover, in the production of a biaxially stretched polyester film, by stretching the film while holding the film edge with clips or the like, the film can be secured in the longitudinal and transverse directions, and, thus, in the heat setting process, a high temperature can be applied while maintaining the planarity without creating wrinkles and the like. Accordingly, heat treatment, which is performed after application, can be performed at a high temperature that cannot be achieved by other methods, thus the film formability of the functional layer is increased, the functional layer and the substrate film can be more firmly adhered to each other, moreover a strong functional layer can be formed, thus the detachment of the functional layer is prevented, and the antistatic capabilities and the release capabilities can be increased.

<Image Forming Substance>

Characters and images containing a thermoplastic resin of an image forming substance or the like can be provided on the surface layer, where the functional layer is not provided, or on the surface layer, where the functional layer is provided, of the present laminated white polyester film 10.

Characters and images can be provided by a conventionally known method, and can be obtained by printing with a copier or a printer. A conventionally known material can also be used as the thermoplastic resin of the image forming substance or the like.

<Resin Layer>

Concerning the present laminated white polyester film 10, a resin layer can be further provided on characters and images containing a thermoplastic resin of an image forming substance or the like.

The primary purpose of providing the resin layer may be to peel off and remove characters and images together with the resin layer from the film to, for example, reuse the laminated white polyester film.

A conventionally known material can be used as the resin layer, and a curable resin layer is preferable.

Examples of the curable resin layer include a thermosetting resin layer and an active energy ray curable resin layer. The active energy ray curable resin layer is preferable from the viewpoint of easily peeling off and remove characters and images completely.

Examples of the active energy ray curable resin layer include an ultraviolet ray curable resin layer, an electron beam curable resin layer, and a visible light curable resin layer. The ultraviolet ray curable resin layer is preferable in view of the ease of handling and curability. An example of the active energy ray curable resin layer is a hard-coat layer.

The material used in the active energy ray curable resin layer is not particularly limited, and examples include cured products of monofunctional (meth)acrylates, polyfunctional (meth)acrylates, and reactive silicon compounds such as tetraethoxysilane. Among these, from the viewpoint of simultaneously achieving productivity and hardness, a polymerized cured product of a composition containing an active energy ray curable (meth)acrylate is particularly preferable.

The composition containing an active energy ray curable (meth)acrylate is not particularly limited. For example, usable are a mixture of one or more known active energy ray curable monofunctional (meth)acrylates, difunctional (meth)acrylates and polyfunctional (meth)acrylates, those commercially available as active energy ray curable hard coat resin materials, and those obtained by further adding, besides these components, other components as long as the object of the present embodiment is not impaired.

The active energy ray curable monofunctional (meth)acrylates are not particularly limited. Examples include alkyl (meth)acrylates such as methyl (meth)acrylate, n-butyl (meth)acrylate, 2-ethylhexyl (meth)acrylate, lauryl (meth)acrylate, stearyl (meth)acrylate, cyclohexyl (meth)acrylate, and isobornyl (meth)acrylate, hydroxyalkyl (meth)acrylates such as hydroxyethyl (meth)acrylate, hydroxypropyl (meth)acrylate, and hydroxybutyl (meth)acrylate, alkoxyalkyl (meth)acrylates such as methoxyethyl (meth)acrylate, ethoxyethyl (meth)acrylate, methoxypropyl (meth)acrylate, and ethoxypropyl (meth)acrylate, aromatic (meth)acrylates such as benzyl (meth)acrylate, phenoxyethyl (meth)acrylate, and phenoxypropyl (meth)acrylate, amino group-containing (meth)acrylates such as diaminoethyl (meth)acrylate and diethylaminoethyl (meth)acrylate, methoxy ethylene glycol (meth)acrylate, phenoxy polyethylene glycol (meth)acrylate, ethylene oxide-modified (meth)acrylates such as phenylphenol ethylene oxide-modified (meth)acrylate, glycidyl (meth)acrylate, tetrahydrofurfuryl (meth)acrylate, and (meth)acrylic acid.

The active energy ray curable difunctional (meth)acrylates are not particularly limited. Examples include alkanediol di(meth)acrylates such as 1,4-butanediol di(meth)acrylate, neopentyl glycol di(meth)acrylate, 1,6-hexanediol di(meth)acrylate, 1,9-nonanediol di(meth)acrylate, and tricyclodecane dimethylol di(meth)acrylate, bisphenol-modified di(meth)acrylates such as bisphenol A ethylene oxide-modified di(meth)acrylates and bisphenol F ethylene oxide-modified di(meth)acrylates, polyethylene glycol di(meth)acrylate, polypropylene glycol di(meth)acrylate, urethane di(meth)acrylate, and epoxy di(meth)acrylate.

The active energy ray curable polyfunctional (meth)acrylates are not particularly limited. Examples include dipentaerythritol hexa(meth)acrylate, pentaerythritol tetra(meth)acrylate, ditrimethylolpropane tetra(meth)acrylate, pentaerythritol tri(meth)acrylate, trimethylolpropane tri(meth)acrylate, isocyanuric acid-modified tri(meth)acrylates such as isocyanuric acid ethylene oxide-modified tri(meth)acrylate and ε-caprolactone-modified tris(acroxyethyl) isocyanurate, and urethane acrylates such as pentaerythritol triacrylate hexamethylene diisocyanate urethane prepolymer, pentaerythritol triacrylate toluene diisocyanate urethane prepolymer, and dipentaerythritol pentaacrylate hexamethylene diisocyanate urethane prepolymer.

Other components contained in the composition containing an active energy ray curable (meth)acrylate are not particularly limited. Examples include inorganic or organic fine particles, a polymerization initiator, a polymerization inhibitor, an antioxidant, an antistatic agent, a dispersant, a surfactant, a light stabilizer, and a leveling agent. When drying is performed after film formation by a wet-coating method, any amount of a solvent can be added.

For in-door use such as in an office, a solvent is preferably not contained. The solvent content in a resin (resin solution) for forming the resin layer is in the range of preferably 10% by weight or less, more preferably 5% by weight or less, even more preferably 3% by weight or less, and particularly preferably 1% by weight or less, and most preferably the solvent is not contained (not intentionally contained).

Examples of the method for forming the resin layer include commonly used wet coating methods such as a roll coating method and a die coating method, and an extrusion method. The formed resin layer can be subjected to a curing reaction by being heated or irradiated with active energy rays such as ultraviolet rays and electron beams as necessary.

<Explanation of Terms and Phrases>

Herein, unless otherwise specified, "X to Y" (X and Y represent any numbers) includes the meaning of "preferably greater than X" or "preferably less than Y" in addition to the meaning of "X or more and Y or less".

Also, unless otherwise specified, "X or more" (X represents any number) includes the meaning of "preferably greater than X", and unless otherwise specified, "Y or less" (Y represents any number) includes the meaning of "preferably less than Y".

EXAMPLES

Below, the present invention will now be described in more detail by way of Examples. The present invention is not limited to the following Examples as long as the gist of the present invention is not exceeded. The measurement methods used in the present invention are as follows. Various physical properties and the measurement methods and definitions thereof in the present invention are as follows.

<Measurement Methods>

(1) Intrinsic Viscosity of Polyester

One gram of polyester from which other components such as a polyester-incompatible polymer component and particles had been removed was precisely weighed, dissolved in 100 ml of a mixed solvent of phenol/tetrachloroethane=50/50 (weight ratio), and measured at 30° C.

(2) Melt Flow Index (MFI)

Amorphous polyolefin was measured at 275° C. under 21.2 N, and polypropylene was measured at 230° C. under 21.2 N, in accordance with JIS K 7210-1995. A greater value represents a lower melt viscosity of the polymer.

(3) Arithmetic Mean Roughness (Ra)

An average of the arithmetic mean roughness Ra values of 10 points on a film surface was obtained by measuring a 640 μm×480 μm area using a non-contact surface/layer cross-sectional shape measurement system VertScan® R550GML manufactured by Ryoka Systems Inc. with a CCD camera: SONY HR-50 1/3', objective lens: 20 magnification, lens barrel: 1× Body, zoom lens: No Relay, wavelength filter: 530 white, measurement mode: wave, and output by fourth-order polynomial correction.

(4) Average Particle Size of Particles

The particle size was measured by a sedimentation method based on Stokes Law of Resistance using a centrifugal sedimentation type particle size distribution analyzer SA-CP3 manufactured by Shimadzu Corporation. The average particle size was obtained using the integrated (volume-based) 50% value in the equivalent size distribution of particles obtained by the measurement.

(5) Film Thickness of Functional Layer

The surface of the functional layer was stained with $RuO_4$ and embedded in an epoxy resin. Then, a section prepared by an ultrathin sectioning method was stained with $RuO_4$, and the cross-section of the functional layer was observed using a transmission electron microscope (H-7650 manufactured by Hitachi High-Technologies Corporation, accelerating voltage 100 kV) to measure the film thickness.

(6) Number Average Molecular Weight

The number average molecular weight was measured using gel permeation chromatography (HLC-8120GPC manufactured by Tosoh Corporation). The number average molecular weight was calculated in terms of polystyrene.

(7) Heat Shrinkage

A sample in an unstretched state was treated for 30 minutes in an oven retained at 150° C., the length of the sample before and after the treatment was measured, and the heat shrinkage was calculated by following formula:

$$\text{Heat shrinkage (\%)} = \{(L0-L1)/L0\} \times 100$$

(where L0 is the length of the sample before heat treatment, and L1 is the length of the sample after heat treatment)

Measurement was made in 5 points in the film longitudinal direction (MD) and in the width direction (TD), and the average with respect to each direction was determined.

(8) Surface Resistance Value

Using a high resistance meter HP4339B and a measurement electrode HP16008B manufactured by Hewlett Packard Japan, a polyester film was sufficiently conditioned in a measurement atmosphere having 23° C. and 50% RH, and then the surface resistance value of the functional layer after 1 minute at an applied voltage of 100 V was measured.

(9) Hunter Whiteness

The Hunter whiteness (Wb) of a single film was measured in accordance with the method of JIS P 8123-1961 using a colorimeter NDH-1001 DP (illuminant C, 2° visual field) manufactured by Nippon Denshoku Industries Co., Ltd. The back surface of the film was held by a black plate.

(10) b Value (Reflection Method)

The b value of a single film was measured in accordance with the method of JIS Z-8722, 8730 using a colorimeter NDH-1001 DP (illuminant C, 2° visual field) manufactured by Nippon Denshoku Industries Co., Ltd. The back surface of the film was held by a black plate.

(11) Masking Properties (OD)

The transmission density for white light was measured using a Macbeth densitometer TD-904. Measurement was made in 5 points, and the average value was regarded as an OD value. A larger value represents a lower light transmittance.

(12) Apparent Density (g/cm$^3$)

A 10 cm×10 cm square sample was cut out of a portion of the film, and the thicknesses of 9 locations of the film was uniformly measured with a micrometer. From the average value thereof and the film weight, the weight per unit volume was calculated and regarded as the apparent density. The number of measured points was 5, and the average value thereof was used.

(13) Thickness of Laminated White Film

A small piece of film was secured and shaped with an epoxy resin and then cut with a microtome, and the cross-section of the film was observed under a transmission electron micrograph. On the cross-section, two boundaries are observed due to light and dark colors, which are substantially parallel with the film surface. The distance between the two boundaries and the film surface was measured from 10 photographs, and the average value was regarded as the thickness of a laminated white film.

(14) Image Quality Appropriateness by Electrophotographic Printing

A film (sheet) cut to the A4 size was fed to a multifunctional device imagio MPC5001it manufactured by Ricoh Co., Ltd., to obtain a full-color test image on which an image forming substance was applied by photographic printing. The image quality was evaluated as follows.

(Evaluation Criteria)

A: High-definition, high-quality image without wrinkles formed on film

B: Part of image slightly unclear, but no problem in practical use

C: Wrinkles formed on film, and image unclear and inferior as a whole

(15) Character/Image (Toner Image) Peel-Off and Removal Appropriateness

A mixture composed of 95 parts by weight of an ultraviolet curable resin (2-hydroxy-3-phenoxypropyl acrylate) and 5 parts by weight of a photopolymerization initiator (trade name: Irgacure 184, manufactured by Ciba Specialty Chemicals Inc.) was uniformly applied to the film surface to which the image forming substance obtained in (14) was fixed, and a glass plate was placed on the mixture and irradiated with ultraviolet light from above to form a ultraviolet light cured resin layer. Then, the glass plate and the film were peeled off. At this time, the formed ultraviolet light cured resin layer adhered to the glass plate side, and it was possible to transfer and retain characters and images resulting from the image forming substance or the like formed on the film surface. The following evaluations were made concerning the state of peel-off and removal of characters and images on the film surface at this time.

(Evaluation Criteria)

A: The image forming substance on the film surface can be completely removed, and the film can be repeatedly used as copy paper.

B: The image forming substance partially slightly remains on the film surface, but the film can be repeatedly used as a copy paper, and there is no problem in practical use.

C: The image forming substance mostly remains on the film surface, and the film cannot be repeatedly used as copy paper.

(16) Print Feedability 100 pieces of film (sheet) cut to the A4 size were fed to a multifunctional device imagio MPC5001it manufactured by Ricoh Co., Ltd., and the film (sheet) feedability of the multifunctional device when performing continuous printing on the 100 pieces by photographic printing was evaluated as follows.

(Evaluation Criteria)

A: There is completely no film (sheet) jam in the multifunctional device. Also, it is verified from the output tray of the multifunctional device that there is completely no simultaneous feeding of multiple pieces of printed film (sheet), and the pieces can be independently fed one after the other.

B: It is verified from the output tray of the multifunctional device that simultaneous feeding of multiples pieces of printed film (sheet) sometimes occurs, but it is not problematic in practical use and there is no film (sheet) jam in the multifunctional device, and continuous printing can be performed.

C: Pieces of film (sheet) adhere to each other, several pieces of film are formed into a mass, and thus the multifunctional device cannot feed the film (sheet), or film (sheet) jam frequently occurs in the multifunctional device, and thus continuous printing cannot be performed, or even if printing is barely possible, the image is unclear and inferior as a whole.

(17) Writeability

Five straight lines were drawn at intervals of 1 mm with a pencil UNI having a hardness H manufactured by Mitsubishi Pencil Co., Ltd., and the following visual evaluations were made.

(Evaluation Criteria)

A: Each straight line can be identified.

B: The line color is light, and it is difficult to identify each line.

C: Straight line cannot be drawn.

(18) Functional Layer Appearance

The laminated white film was observed under a fluorescent lamp, and the appearance of the functional layer was visually evaluated as follows.

(Evaluation Criteria)

A: Uniform appearance, with no defects observed in the functional layer

B: Some defects observed in the functional layer

C: Defects observed in large part of the functional layer

Example 1 Group

Example 1-1 to Example 1-69 and Comparative Example 1-1 to Comparative Example 1-2 will now be described as Examples of the first embodiment.

<Functional Layer>

Compounds constituting the functional layer are as follows.

Antistatic Agent (Compound Having an Ammonium Group): (IA)

Polymer obtained by polymerizing the following composition having a pyrrolidinium ring in the main chain Diallyldimethylammonium chloride/dimethylacrylamide/N-methylolacrylamide=90/5/5 (mol %). Number average molecular weight 30000.

Antistatic Agent (Compound Having an Ammonium Group): (IB)

Polymer compound composed of a structural unit represented by following formula (2) and having a number average molecular weight of 50000, wherein the counter ion is a methanesulfonic acid ion.

[Formula 2]

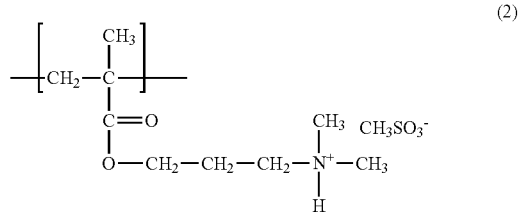

(2)

Release Agent (Long Chain Alkyl Group-Containing Compound): (IIA)

First, 200 parts by weight of xylene and 600 parts by weight of octadecyl isocyanate were added to a four-neck flask and heated while being stirring. From the time when xylene began to reflux, 100 parts by weight of polyvinyl alcohol having an average degree of polymerization of 500 and a degree of saponification of 88 mol % was added portionwise at intervals of 10 minutes for about 2 hours. After adding polyvinyl alcohol, the mixture was refluxed for 2 more hours, and the reaction was terminated. After the reaction mixture was cooled to about 80° C. and then added to methanol, the reaction product precipitated as white precipitates. Thus, an operation to filter off the precipitates, add 140 parts by weight of xylene, heat the mixture for complete dissolution, and again add methanol to precipitate the reaction product was repeated several times. Then, the precipitates were washed with methanol and subjected to dry pulverization.

Release Agent (Polyether Group-Containing Condensed Silicone): (IIB)

Polyether group-containing silicone with a number average molecular weight of 7000 containing 1 polyethylene glycol (with a hydroxyl group terminal) wherein the ethylene glycol chain is 8 based on 100 of dimethyl silicone in terms of molar ratio in the side chain of dimethyl silicone (when the siloxane bond of silicone is 1, the ether bond of a polyether group is 0.07 in terms of molar ratio). Low molecular weight components having a number average molecular weight of 500 or less was 3% by weight, and neither a vinyl group bonded to silicon (vinylsilane) nor a hydrogen group bonded to silicon (hydrogensilane) were present. The present compound contained 1 polyether group-containing silicone and 0.25 dodecylbenzene sulfonate in terms of weight ratio, and was dispersed in water.

Release Agent (Wax): (IIC)

Wax emulsion obtained by adding 300 g of oxidized polyethylene wax having a melting point of 105° C., an acid value of 16 mg KOH/g, a density of 0.93 g/mL, and a number average molecular weight of 5000, 650 g of ion-exchanged water, 50 g of a decaglycerin monooleate surfactant, and 10 g of a 48 wt % aqueous potassium hydroxide solution to an emulsification apparatus having an internal capacity of 1.5 L and equipped with a stirrer, a thermometer, and a temperature controller, purging the apparatus with nitrogen, then hermetically sealing the apparatus, rapidly stirring the mixture at 150° C. for 1 hour, cooling the mixture to 130° C., causing the mixture to pass through a high-pressure homogenizer under 400 atm, and cooling the mixture to 40° C.

Acrylic Resin: (III)

Emulsion polymerization product (emulsifier: nonionic surfactant) of ethyl acrylate/n-butyl acrylate/N-methylol acrylamide/acrylic acid=88/10/1/1 (wt %)

Crosslinking Agent (Oxazoline Compound): (IVA)

Acrylic polymer Epocros® having an oxazoline group and a polyalkylene oxide chain (amount of oxazoline group=4.5 mmol/g, manufactured by Nippon Shokubai Co., Ltd.)

Crosslinking Agent (Isocyanate-Based Compound): (IVB)

First, 1000 parts by weight of hexamethylene diisocyanate was stirred at 60° C., and 0.1 parts by weight of tetramethylammonium caprylate was added as a catalyst. After 4 hours, 0.2 parts by weight of phosphoric acid was added to terminate the reaction to obtain an isocyanurate-type polyisocyanate composition. Then, 100 parts by weight of the resulting isocyanurate-type polyisocyanate composition, 42.3 parts by weight of methoxypolyethylene glycol having a number average molecular weight of 400, and 29.5 parts by weight of propylene glycol monomethyl ether acetate were added, and the mixture was maintained at 80° C. for 7 hours. Thereafter, the reaction solution temperature was maintained at 60° C., and 35.8 parts by weight of methyl isobutanoylacetate, 32.2 parts by weight of diethyl malonate, and 0.88 parts by weight of a 28 wt % methanol solution of sodium methoxide were added, and the mixture was maintained for 4 hours. Then, 58.9 parts by weight of n-butanol was added, and the reaction solution temperature was maintained at 80° C. for 2 hours, then 0.86 parts by weight of 2-ethylhexyl acid phosphate was added, and thus block polyisocyanate by active methylene was obtained.

Crosslinking Agent (Hexamethoxy Methylol Melamine): (IVC)

Example 1-1

For an intermediate layer, 80 parts by weight of polyethylene terephthalate chips having an intrinsic viscosity of 0.67 dl/g and 20 parts by weight of crystalline polypropylene homopolymer chips having a melt flow index of 10 ml/10 min were fed to a main vented biaxial extruder set to 280° C., and for a surface layer, 15 parts by weight of polyethylene terephthalate chips having an intrinsic viscosity of 0.66 dl/g and containing 50% by weight of titanium oxide particles having an average particle diameter of 0.32 μm, 15 parts by weight of crystalline polypropylene homopolymer chips having a melt flow index of 8 ml/10 min, 10 parts by weight of polyethylene terephthalate chips having an intrinsic viscosity of 0.66 dl/g and containing 3.5% by weight of silica particles having an average particle diameter of 4.1 μm, and 60 parts by weight of polyethylene terephthalate chips having an intrinsic viscosity of 0.69 dl/g were fed to an auxiliary vented biaxial extruder set to 280° C. The polymer from the main extruder as an intermediate layer and the polymer from the auxiliary extruder as a surface layer were co-extruded out of a cap via a gear pump and a filter so as to provide a two-type, three-layer (surface layer/intermediate layer/surface layer) layer configuration, and quenched and solidified on a cooling roll set to a surface temperature of 30° C. using an electrostatic pinning method, and thus a substantially amorphous sheet having a thickness of 887 μm was obtained.

The resulting amorphous sheet was stretched 3.1-fold in the longitudinal direction at 92° C., then aqueous coating solution 1 shown in Table 7 below was applied to both surfaces of this longitudinally stretched film such that the film thickness of the functional layer (after being dried) was 0.10 μm, the film was guided to a tenter, then stretched 3.8-fold in the transverse direction at 120° C., heat-treated at 235° C. for 10 seconds, and relaxed 10% in the transverse direction, and thus a laminated white film having a total thickness of 74 μm with a thickness configuration of 6 μm (surface layer)/62 μm (intermediate layer)/6 μm (surface layer) was obtained.

When the resulting laminated white film was evaluated, the image quality appropriateness, character/image peel-off and removal appropriateness, print feedability, writeability, and functional layer appearance were all favorable. The properties of this film are shown in Tables 4 and 8 below.

Examples 1-2 to 1-4

A laminated white film was obtained in the same manner as in Example 1-1 except that the film thickness of the functional layer (after being dried) was changed as shown in Table 1.

As shown in Tables 4 and 8 below, the resulting laminated white film had favorable image quality appropriateness and writeability.

Examples 1-5 to 1-14

A laminated white film was obtained in the same manner as in Example 1-1 except that the composition of the coating solution for the functional layer was changed. The production conditions in the respective Examples are shown in Table 1 below, and the composition of the coating solution for the functional layer is shown in Table 7 below.

As shown in Tables 4 and 8 below, the resulting polyester film had favorable image quality appropriateness and writeability.

Example 1-15

A laminated white film having a thickness of 75 µm was obtained in the same manner as in Example 1-1 except that the intermediate layer was made from a mixed source material obtained by mixing in proportions of 40 parts by weight of polyethylene terephthalate chips having an intrinsic viscosity of 0.63 dl/g, 15 parts by weight of crystalline polypropylene homopolymer chips having a melt flow index of 7 ml/10 min, and 45% by weight of a recycled article made from the outside edge generated during polyester production in Example 1-1 and the master roll outside edge. The thickness of each layer of the resulting film was 6 µm/63 µm/6 µm. The total amount of polypropylene derived from the crystalline polypropylene homopolymer chips and derived from the recycled article in the intermediate layer was 24% by weight.

When the resulting laminated white film was evaluated, the image quality appropriateness, character/image peel-off and removal appropriateness, print feedability, writeability, and functional layer appearance were all favorable. The properties of this film are shown in Tables 4 and 8 below.

Examples 1-16 to 1-18

A laminated white film was obtained in the same manner as in Example 1-15 except that the film thickness of the functional layer (after being dried) was changed as shown in Table 1. As shown in Tables 4 and 8 below, the resulting laminated white film had favorable image quality appropriateness and writeability.

Examples 1-19 to 1-27

A laminated white film was obtained in the same manner as in Example 1-15 except that the composition of the coating solution for the functional layer was changed. The production conditions in the respective Examples are shown in Table 1 below, and the composition of the coating solution for the functional layer is shown in Table 7 below.

As shown in Tables 4 and 8, the resulting polyester film had favorable image quality appropriateness, character/image peel-off and removal appropriateness, print feedability, and writeability.

Example 1-28

A laminated white film having a thickness of 75 µm was obtained in the same manner as in Example 1-1 except that the intermediate layer was made from a mixed source material obtained by mixing in proportions of 3 parts by weight of polyethylene terephthalate chips having an intrinsic viscosity of 0.66 dl/g, 10 parts by weight of crystalline polypropylene homopolymer chips having a melt flow index of 10 ml/10 min, and 87% by weight of a recycled article made from the outside edge generated during polyester production in Example 1-1 and the master roll outside edge. The thickness of each layer of the resulting film was 6 µm/63 µm/6 µm.

When the resulting laminated white film was evaluated, the character/image peel-off and removal appropriateness, print feedability, writeability, and functional layer appearance were all favorable. The properties of this film are shown in Tables 4 and 8 below.

Examples 1-29 to 1-31

A laminated white film was obtained in the same manner as in Example 1-28 except that the film thickness of the functional layer (after being dried) was changed as shown in Table 1. As shown in Tables 4 and 8 below, the resulting laminated white film had favorable image quality appropriateness and writeability.

Examples 1-32 to 1-40

A laminated white film was obtained in the same manner as in Example 1-28 except that the composition of the coating solution for the functional layer was changed. The production conditions in the respective Examples are shown in Table 1 below, and the composition of the coating solution for the functional layer is shown in Table 7 below.

As shown in Tables 4 and 8, the resulting polyester film had favorable character/image peel-off and removal appropriateness, print feedability, and writeability.

Example 1-41

A laminated white film having a thickness of 75 µm was obtained in the same manner as in Example 1-15 except that the surface layer contained 15 parts by weight of polyethylene terephthalate chips having an intrinsic viscosity of 0.65 dl/g and containing 50% by weight of titanium oxide particles having an average particle diameter of 0.32 µm, 1.3 parts by weight of crystalline polypropylene homopolymer chips having a melt flow index of 8 ml/10 min, 1.6 parts by weight of polyethylene terephthalate chips having an intrinsic viscosity of 0.66 dl/g and containing 0.5% by weight of silica particles having an average particle diameter of 4.1 µm, and 82.1 parts by weight of polyethylene terephthalate chips having an intrinsic viscosity of 0.68 dl/g. The thickness of each layer of the resulting film was 6 µm/63 µm/6 µm.

When the resulting laminated white film was evaluated, the image quality appropriateness, character/image peel-off and removal appropriateness, print feedability, and functional layer appearance were all favorable. The properties of this film are shown in Tables 5 and 9 below.

Examples 1-42 to 1-44

A laminated white film was obtained in the same manner as in Example 1-41 except that the film thickness of the functional layer (after being dried) was changed as shown in Table 2. As shown in Tables 5 and 9 below, the resulting laminated white film had favorable image quality appropriateness and writeability.

Examples 1-45 to 1-53

A laminated white film was obtained in the same manner as in Example 1-41 except that the composition of the coating solution for the functional layer was changed. The production conditions in the respective Examples are shown in Table 2 below, and the composition of the coating solution for the functional layer is shown in Table 7 below.

As shown in Tables 5 and 9, the resulting polyester film had favorable image quality appropriateness, character/image peel-off and removal appropriateness, and print feedability.

Example 1-54

A laminated white film having a thickness of 75 μm was obtained in the same manner as in Example 1-15 except that the surface layer contained 15 parts by weight of polyethylene terephthalate chips having an intrinsic viscosity of 0.65 dl/g and containing 50% by weight of titanium oxide particles having an average particle diameter of 0.32 μm, 0.5 parts by weight of crystalline polypropylene homopolymer chips having a melt flow index of 8 ml/10 min, 10 parts by weight of polyethylene terephthalate chips having an intrinsic viscosity of 0.66 dl/g and containing 3.5% by weight of silica particles having an average particle diameter of 4.1 μm, and 74.5 parts by weight of polyethylene terephthalate chips having an intrinsic viscosity of 0.68 dl/g, and the coating solution was applied to only one surface in the coating step of the coating solution after longitudinal stretching. The thickness of each layer of the resulting film was 6 μm/63 μm/6 μm.

Concerning the resulting laminated white film, the image quality appropriateness, character/image peel-off and removal appropriateness, and writeability of the surface to which the coating solution was not applied were evaluated. The image quality appropriateness, print feedability, and functional layer appearance were favorable. The properties of this film are shown in Tables 5 and 9 below.

Examples 1-55

A laminated white film having a thickness of 75 μm was obtained in the same manner as in Example 1-15 except that 15 parts by weight of polyethylene terephthalate chips having an intrinsic viscosity of 0.66 dl/g and containing 50% by weight of titanium oxide particles having an average particle diameter of 0.12 μm, 15 parts by weight of crystalline polypropylene homopolymer chips having a melt flow index of 8 ml/10 min, 10 parts by weight of polyethylene terephthalate chips having an intrinsic viscosity of 0.66 dl/g and containing 3.5% by weight of silica particles having an average particle diameter of 4.1 μm, and 60 parts by weight of polyethylene terephthalate chips having an intrinsic viscosity of 0.69 dl/g were used. The thickness of each layer of the resulting film was 6 μm/63 μm/6 μm.

When the resulting laminated white film was evaluated, there was character/image peel-off and removal appropriateness, and the print feedability, writeability, and functional layer appearance were all favorable. The properties of this film are shown in Tables 5 and 9 below.

Examples 1-56 to 1-58

A laminated white film was obtained in the same manner as in Example 1-55 except that the film thickness of the functional layer (after being dried) was changed as shown in Table 2.

As shown in Tables 5 and 9 below, the resulting laminated white film had favorable image quality appropriateness and writeability.

Examples 1-59 to 1-67

A laminated white film was obtained in the same manner as in Example 1-55 except that the composition of the coating solution for the functional layer was changed. The production conditions in the respective Examples are shown in Table 2 below, and the composition of the coating solution for the functional layer is shown in Table 7 below.

As shown in Tables 5 and 9 below, the resulting polyester film had character/image peel-off and removal appropriateness and favorable print feedability and writeability.

Example 1-68

A laminated white film having a thickness of 75 μm was obtained in the same manner as in Example 1-15 except that the surface layer contained 15 parts by weight of polyethylene terephthalate chips having an intrinsic viscosity of 0.66 dl/g and containing 50% by weight of titanium oxide particles having an average particle diameter of 0.32 μm, 15 parts by weight of crystalline polypropylene homopolymer chips having a melt flow index of 8 ml/10 min, and 70 parts by weight of polyethylene terephthalate chips having an intrinsic viscosity of 0.66 dl/g and containing 5.0% by weight of silica particles having an average particle diameter of 11.1 μm. The thickness of each layer of the resulting film was 6 μm/63 μm/6 μm.

When the resulting laminated white film was evaluated, the image quality appropriateness, print feedability, writeability, and functional layer appearance were all favorable. The properties of this film are shown in Tables 5 and 9 below.

Example 1-69

A laminated white film having a thickness of 75 μm and thicknesses of the respective layers of 6 μm/63 μm/6 μm was obtained in the same manner as in Example 1-15 except that the heat treatment temperature was 201° C., and the film was heat-treated for 10 seconds, in the heat treatment step in the film forming process.

When the resulting laminated white film was evaluated, the print feedability, writeability, and functional layer appearance were all favorable. The properties of this film are shown in Tables 5 and 9 below.

Comparative Example 1-1

A polyester film was obtained in the same manner as in Example 1-1 except that polyethylene terephthalate chips were used in place of the crystalline polypropylene homopolymer chips in Example 1-1 and no functional layer was provided. As shown in Tables 6 and 10, the resulting polyester film had inferior properties with respect to any of the image quality appropriateness, character/image peel-off and removal appropriateness, printability, and writeability.

Comparative Example 1-2

A laminated white film was obtained in the same manner as in Example 1-1 except that the composition of the coating solution for the functional layer was changed. The production conditions of Comparative Example 1-2 are shown in Table 3 below, and the composition of the coating solution for the functional layer is shown in Table 7 below.

As shown in Tables 6 and 10 below, the resulting polyester film had poor image quality appropriateness and print feedability.

TABLE 1

| | Film thickness (μm) | Surface layer thickness (μm) | Heat treatment temperature (° C.) | Surface layer Poly-propylene content (wt %) | TiO$_2$ average particle diameter (μm) | TiO$_2$ content (wt %) | SiO$_2$ average particle diameter (μm) | SiO$_2$ content (wt %) | Intermediate layer Poly-propylene content (wt %) | Recycled article content (wt %) | Functional layer Coating solution | Film thickness (μm) |
|---|---|---|---|---|---|---|---|---|---|---|---|---|
| Ex. 1-1 | 74 | 6 | 235 | 15 | 0.32 | 7.5 | 4.1 | 0.35 | 20 | 0 | 1 | 0.10 |
| Ex. 1-2 | 74 | 6 | 235 | 15 | 0.32 | 7.5 | 4.1 | 0.35 | 20 | 0 | 1 | 0.03 |
| Ex. 1-3 | 74 | 6 | 235 | 15 | 0.32 | 7.5 | 4.1 | 0.35 | 20 | 0 | 1 | 0.05 |
| Ex. 1-4 | 74 | 6 | 235 | 15 | 0.32 | 7.5 | 4.1 | 0.35 | 20 | 0 | 1 | 0.15 |
| Ex. 1-5 | 74 | 6 | 235 | 15 | 0.32 | 7.5 | 4.1 | 0.35 | 20 | 0 | 2 | 0.10 |
| Ex. 1-6 | 74 | 6 | 235 | 15 | 0.32 | 7.5 | 4.1 | 0.35 | 20 | 0 | 3 | 0.10 |
| Ex. 1-7 | 74 | 6 | 235 | 15 | 0.32 | 7.5 | 4.1 | 0.35 | 20 | 0 | 4 | 0.10 |
| Ex. 1-8 | 74 | 6 | 235 | 15 | 0.32 | 7.5 | 4.1 | 0.35 | 20 | 0 | 5 | 0.10 |
| Ex. 1-9 | 74 | 6 | 235 | 15 | 0.32 | 7.5 | 4.1 | 0.35 | 20 | 0 | 6 | 0.10 |
| Ex. 1-10 | 74 | 6 | 235 | 15 | 0.32 | 7.5 | 4.1 | 0.35 | 20 | 0 | 7 | 0.10 |
| Ex. 1-11 | 74 | 6 | 235 | 15 | 0.32 | 7.5 | 4.1 | 0.35 | 20 | 0 | 8 | 0.10 |
| Ex. 1-12 | 74 | 6 | 235 | 15 | 0.32 | 7.5 | 4.1 | 0.35 | 20 | 0 | 9 | 0.10 |
| Ex. 1-13 | 74 | 6 | 235 | 15 | 0.32 | 7.5 | 4.1 | 0.35 | 20 | 0 | 10 | 0.10 |
| Ex. 1-14 | 74 | 6 | 235 | 15 | 0.32 | 7.5 | 4.1 | 0.35 | 20 | 0 | 11 | 0.10 |
| Ex. 1-15 | 75 | 6 | 235 | 15 | 0.32 | 7.5 | 4.1 | 0.35 | 15 | 45 | 1 | 0.10 |
| Ex. 1-16 | 75 | 6 | 235 | 15 | 0.32 | 7.5 | 4.1 | 0.35 | 15 | 45 | 1 | 0.03 |
| Ex. 1-17 | 75 | 6 | 235 | 15 | 0.32 | 7.5 | 4.1 | 0.35 | 15 | 45 | 1 | 0.05 |
| Ex. 1-18 | 75 | 6 | 235 | 15 | 0.32 | 7.5 | 4.1 | 0.35 | 15 | 45 | 1 | 0.15 |
| Ex. 1-19 | 75 | 6 | 235 | 15 | 0.32 | 7.5 | 4.1 | 0.35 | 15 | 45 | 2 | 0.10 |
| Ex. 1-20 | 75 | 6 | 235 | 15 | 0.32 | 7.5 | 4.1 | 0.35 | 15 | 45 | 3 | 0.10 |
| Ex. 1-21 | 75 | 6 | 235 | 15 | 0.32 | 7.5 | 4.1 | 0.35 | 15 | 45 | 4 | 0.10 |
| Ex. 1-22 | 75 | 6 | 235 | 15 | 0.32 | 7.5 | 4.1 | 0.35 | 15 | 45 | 5 | 0.10 |
| Ex. 1-23 | 75 | 6 | 235 | 15 | 0.32 | 7.5 | 4.1 | 0.35 | 15 | 45 | 6 | 0.10 |
| Ex. 1-24 | 75 | 6 | 235 | 15 | 0.32 | 7.5 | 4.1 | 0.35 | 15 | 45 | 7 | 0.10 |
| Ex. 1-25 | 75 | 6 | 235 | 15 | 0.32 | 7.5 | 4.1 | 0.35 | 15 | 45 | 8 | 0.10 |
| Ex. 1-26 | 75 | 6 | 235 | 15 | 0.32 | 7.5 | 4.1 | 0.35 | 15 | 45 | 9 | 0.10 |
| Ex. 1-27 | 75 | 6 | 235 | 15 | 0.32 | 7.5 | 4.1 | 0.35 | 15 | 45 | 10 | 0.10 |
| Ex. 1-28 | 75 | 6 | 235 | 15 | 0.32 | 7.5 | 4.1 | 0.35 | 10 | 85 | 1 | 0.10 |
| Ex. 1-29 | 75 | 6 | 235 | 15 | 0.32 | 7.5 | 4.1 | 0.35 | 10 | 85 | 1 | 0.03 |
| Ex. 1-30 | 75 | 6 | 235 | 15 | 0.32 | 7.5 | 4.1 | 0.35 | 10 | 85 | 1 | 0.05 |
| Ex. 1-31 | 75 | 6 | 235 | 15 | 0.32 | 7.5 | 4.1 | 0.35 | 10 | 85 | 1 | 0.15 |
| Ex. 1-32 | 75 | 6 | 235 | 15 | 0.32 | 7.5 | 4.1 | 0.35 | 10 | 85 | 2 | 0.10 |
| Ex. 1-33 | 75 | 6 | 235 | 15 | 0.32 | 7.5 | 4.1 | 0.35 | 10 | 85 | 3 | 0.10 |
| Ex. 1-34 | 75 | 6 | 235 | 15 | 0.32 | 7.5 | 4.1 | 0.35 | 10 | 85 | 4 | 0.10 |
| Ex. 1-35 | 75 | 6 | 235 | 15 | 0.32 | 7.5 | 4.1 | 0.35 | 10 | 85 | 5 | 0.10 |
| Ex. 1-36 | 75 | 6 | 235 | 15 | 0.32 | 7.5 | 4.1 | 0.35 | 10 | 85 | 6 | 0.10 |
| Ex. 1-37 | 75 | 6 | 235 | 15 | 0.32 | 7.5 | 4.1 | 0.35 | 10 | 85 | 7 | 0.10 |
| Ex. 1-38 | 75 | 6 | 235 | 15 | 0.32 | 7.5 | 4.1 | 0.35 | 10 | 85 | 8 | 0.10 |
| Ex. 1-39 | 75 | 6 | 235 | 15 | 0.32 | 7.5 | 4.1 | 0.35 | 10 | 85 | 9 | 0.10 |
| Ex. 1-40 | 75 | 6 | 235 | 15 | 0.32 | 7.5 | 4.1 | 0.35 | 10 | 85 | 10 | 0.10 |

TABLE 2

| | Film thickness (μm) | Surface layer thickness (μm) | Heat treatment temperature (° C.) | Surface layer Poly-propylene content (wt %) | TiO$_2$ average particle diameter (μm) | TiO$_2$ content (wt %) | SiO$_2$ average particle diameter (μm) | SiO$_2$ content (wt %) | Intermediate layer Poly-propylene content (wt %) | Recycled article content (wt %) | Functional layer Coating solution | Film thickness (μm) |
|---|---|---|---|---|---|---|---|---|---|---|---|---|
| Ex. 1-41 | 75 | 6 | 235 | 1.3 | 0.32 | 7.5 | 4.1 | 0.008 | 15 | 45 | 1 | 0.10 |
| Ex. 1-42 | 75 | 6 | 235 | 1.3 | 0.32 | 7.5 | 4.1 | 0.008 | 15 | 45 | 1 | 0.03 |
| Ex. 1-43 | 75 | 6 | 235 | 1.3 | 0.32 | 7.5 | 4.1 | 0.008 | 15 | 45 | 1 | 0.05 |
| Ex. 1-44 | 75 | 6 | 235 | 1.3 | 0.32 | 7.5 | 4.1 | 0.008 | 15 | 45 | 1 | 0.15 |
| Ex. 1-45 | 75 | 6 | 235 | 1.3 | 0.32 | 7.5 | 4.1 | 0.008 | 15 | 45 | 2 | 0.10 |
| Ex. 1-46 | 75 | 6 | 235 | 1.3 | 0.32 | 7.5 | 4.1 | 0.008 | 15 | 45 | 3 | 0.10 |
| Ex. 1-47 | 75 | 6 | 235 | 1.3 | 0.32 | 7.5 | 4.1 | 0.008 | 15 | 45 | 4 | 0.10 |
| Ex. 1-48 | 75 | 6 | 235 | 1.3 | 0.32 | 7.5 | 4.1 | 0.008 | 15 | 45 | 5 | 0.10 |
| Ex. 1-49 | 75 | 6 | 235 | 1.3 | 0.32 | 7.5 | 4.1 | 0.008 | 15 | 45 | 6 | 0.10 |
| Ex. 1-50 | 75 | 6 | 235 | 1.3 | 0.32 | 7.5 | 4.1 | 0.008 | 15 | 45 | 7 | 0.10 |
| Ex. 1-51 | 75 | 6 | 235 | 1.3 | 0.32 | 7.5 | 4.1 | 0.008 | 15 | 45 | 8 | 0.10 |
| Ex. 1-52 | 75 | 6 | 235 | 1.3 | 0.32 | 7.5 | 4.1 | 0.008 | 15 | 45 | 9 | 0.10 |
| Ex. 1-53 | 75 | 6 | 235 | 1.3 | 0.32 | 7.5 | 4.1 | 0.008 | 15 | 45 | 10 | 0.10 |

TABLE 2-continued

| | Film thickness (μm) | Surface layer thickness (μm) | Heat treatment temperature (° C.) | Surface layer Polypropylene content (wt %) | TiO$_2$ average particle diameter (μm) | TiO$_2$ content (wt %) | SiO$_2$ average particle diameter (μm) | SiO$_2$ content (wt %) | Intermediate layer Polypropylene content (wt %) | Recycled article content (wt %) | Functional layer Coating solution | Film thickness (μm) |
|---|---|---|---|---|---|---|---|---|---|---|---|---|
| Ex. 1-54 | 75 | 6 | 235 | 0.5 | 0.32 | 7.5 | 4.1 | 0.35 | 15 | 45 | 1 | 0.10 |
| Ex. 1-55 | 75 | 6 | 235 | 15 | 0.12 | 7.5 | 4.1 | 0.35 | 15 | 45 | 1 | 0.10 |
| Ex. 1-56 | 75 | 6 | 235 | 15 | 0.12 | 7.5 | 4.1 | 0.35 | 15 | 45 | 1 | 0.03 |
| Ex. 1-57 | 75 | 6 | 235 | 15 | 0.12 | 7.5 | 4.1 | 0.35 | 15 | 45 | 1 | 0.05 |
| Ex. 1-58 | 75 | 6 | 235 | 15 | 0.12 | 7.5 | 4.1 | 0.35 | 15 | 45 | 1 | 0.15 |
| Ex. 1-59 | 75 | 6 | 235 | 15 | 0.12 | 7.5 | 4.1 | 0.35 | 15 | 45 | 2 | 0.10 |
| Ex. 1-60 | 75 | 6 | 235 | 15 | 0.12 | 7.5 | 4.1 | 0.35 | 15 | 45 | 3 | 0.10 |
| Ex. 1-61 | 75 | 6 | 235 | 15 | 0.12 | 7.5 | 4.1 | 0.35 | 15 | 45 | 4 | 0.10 |
| Ex. 1-62 | 75 | 6 | 235 | 15 | 0.12 | 7.5 | 4.1 | 0.35 | 15 | 45 | 5 | 0.10 |
| Ex. 1-63 | 75 | 6 | 235 | 15 | 0.12 | 7.5 | 4.1 | 0.35 | 15 | 45 | 6 | 0.10 |
| Ex. 1-64 | 75 | 6 | 235 | 15 | 0.12 | 7.5 | 4.1 | 0.35 | 15 | 45 | 7 | 0.10 |
| Ex. 1-65 | 75 | 6 | 235 | 15 | 0.12 | 7.5 | 4.1 | 0.35 | 15 | 45 | 8 | 0.10 |
| Ex. 1-66 | 75 | 6 | 235 | 15 | 0.12 | 7.5 | 4.1 | 0.35 | 15 | 45 | 9 | 0.10 |
| Ex. 1-67 | 75 | 6 | 235 | 15 | 0.12 | 7.5 | 4.1 | 0.35 | 15 | 45 | 10 | 0.10 |
| Ex. 1-68 | 75 | 6 | 235 | 15 | 0.32 | 7.5 | 11.1 | 3.50 | 15 | 45 | 1 | 0.10 |
| Ex. 1-69 | 75 | 6 | 201 | 15 | 0.32 | 7.5 | 4.1 | 0.35 | 15 | 45 | 1 | 0.10 |

TABLE 3

| | Film thickness (μm) | Surface layer thickness (μm) | Heat treatment temperature (° C.) | Surface layer Polypropylene content (wt %) | TiO$_2$ average particle diameter (μm) | TiO$_2$ content (wt %) | SiO$_2$ average particle diameter (μm) | SiO$_2$ content (wt %) | Intermediate layer Polypropylene content (wt %) | Recycled article content (wt %) | Functional layer Coating solution | Film thickness (μm) |
|---|---|---|---|---|---|---|---|---|---|---|---|---|
| Comp. Ex. 1-1 | 74 | 6 | 235 | 0 | 0.35 | 7.5 | 4.1 | 0.35 | 0 | 0 | — | — |
| Comp. Ex. 1-2 | 74 | 6 | 235 | 15 | 0.35 | 7.5 | 4.1 | 0.35 | 20 | 0 | 12 | 0.10 |

TABLE 4

| | Arithmetic mean roughness (SRa) (nm) | b Value (—) | Heat shrinkage at 150° C. for 30 min MD/TD (%) | Surface resistance value (Ω) | Hunter whiteness (%) | Masking properties (OD) (—) | Apparent density (g/cm$^3$) |
|---|---|---|---|---|---|---|---|
| Example 1-1 | 565 | −0.88 | 1.7/1.4 | $1 \times 10^9$ | 84.2 | 0.51 | 1.0 |
| Example 1-2 | 565 | −1.01 | 1.7/1.4 | $6 \times 10^9$ | 84.1 | 0.50 | 1.0 |
| Example 1-3 | 565 | −0.98 | 1.7/1.4 | $3 \times 10^9$ | 84.3 | 0.50 | 1.0 |
| Example 1-4 | 565 | −0.84 | 1.7/1.4 | $9 \times 10^8$ | 84.2 | 0.51 | 1.0 |
| Example 1-5 | 565 | −0.88 | 1.7/1.4 | $1 \times 10^9$ | 84.2 | 0.51 | 1.0 |
| Example 1-6 | 565 | −0.88 | 1.7/1.4 | $5 \times 10^9$ | 84.2 | 0.51 | 1.0 |
| Example 1-7 | 565 | −0.88 | 1.7/1.4 | $1 \times 10^9$ | 84.6 | 0.53 | 1.0 |
| Example 1-8 | 565 | −0.88 | 1.7/1.4 | $9 \times 10^8$ | 84.5 | 0.53 | 1.0 |
| Example 1-9 | 565 | −0.88 | 1.7/1.4 | $8 \times 10^9$ | 84.4 | 0.52 | 1.0 |
| Example 1-10 | 565 | −0.88 | 1.7/1.4 | $3 \times 10^9$ | 84.4 | 0.52 | 1.0 |
| Example 1-11 | 565 | −0.88 | 1.7/1.4 | $5 \times 10^9$ | 84.4 | 0.52 | 1.0 |
| Example 1-12 | 565 | −0.88 | 1.7/1.4 | $4 \times 10^9$ | 84.4 | 0.53 | 1.0 |
| Example 1-13 | 565 | −0.84 | 1.7/1.4 | $1 \times 10^9$ | 84.5 | 0.53 | 1.0 |
| Example 1-14 | 565 | −0.84 | 1.7/1.4 | $1 \times 10^9$ | 84.4 | 0.52 | 1.0 |
| Example 1-15 | 590 | −0.85 | 1.7/1.4 | $1 \times 10^9$ | 84.3 | 0.52 | 1.0 |
| Example 1-16 | 590 | −0.97 | 1.7/1.4 | $6 \times 10^9$ | 84.1 | 0.50 | 1.0 |
| Example 1-17 | 590 | −0.92 | 1.7/1.4 | $3 \times 10^9$ | 84.2 | 0.53 | 1.0 |
| Example 1-18 | 590 | −0.79 | 1.7/1.4 | $9 \times 10^8$ | 84.3 | 0.52 | 1.0 |
| Example 1-19 | 590 | −0.85 | 1.7/1.4 | $1 \times 10^9$ | 84.3 | 0.52 | 1.0 |
| Example 1-20 | 590 | −0.85 | 1.7/1.4 | $5 \times 10^9$ | 84.3 | 0.52 | 1.0 |

TABLE 4-continued

|  | Arithmetic mean roughness (SRa) (nm) | b Value (—) | Heat shrinkage at 150° C. for 30 min MD/TD (%) | Surface resistance value ($\Omega$) | Hunter whiteness (%) | Masking properties (OD) (—) | Apparent density (g/cm$^3$) |
| --- | --- | --- | --- | --- | --- | --- | --- |
| Example 1-21 | 590 | −0.85 | 1.7/1.4 | $1 \times 10^9$ | 84.5 | 0.54 | 1.0 |
| Example 1-22 | 590 | −0.85 | 1.7/1.4 | $9 \times 10^8$ | 84.4 | 0.52 | 1.0 |
| Example 1-23 | 590 | −0.85 | 1.7/1.4 | $8 \times 10^9$ | 84.3 | 0.52 | 1.0 |
| Example 1-24 | 590 | −0.85 | 1.7/1.4 | $3 \times 10^9$ | 84.3 | 0.52 | 1.0 |
| Example 1-25 | 590 | −0.85 | 1.7/1.4 | $5 \times 10^9$ | 84.3 | 0.52 | 1.0 |
| Example 1-26 | 590 | −0.78 | 1.7/1.4 | $4 \times 10^9$ | 84.4 | 0.53 | 1.0 |
| Example 1-27 | 590 | −0.78 | 1.7/1.4 | $1 \times 10^9$ | 84.4 | 0.53 | 1.0 |
| Example 1-28 | 589 | −0.40 | 1.5/1.3 | $1 \times 10^9$ | 83.6 | 0.46 | 1.1 |
| Example 1-29 | 589 | −0.52 | 1.5/1.3 | $6 \times 10^9$ | 83.5 | 0.45 | 1.1 |
| Example 1-30 | 589 | −0.51 | 1.5/1.3 | $3 \times 10^9$ | 83.5 | 0.45 | 1.1 |
| Example 1-31 | 589 | −0.38 | 1.5/1.3 | $9 \times 10^8$ | 83.5 | 0.45 | 1.1 |
| Example 1-32 | 589 | −0.40 | 1.5/1.3 | $1 \times 10^9$ | 83.6 | 0.46 | 1.1 |
| Example 1-33 | 589 | −0.40 | 1.5/1.3 | $5 \times 10^9$ | 83.6 | 0.46 | 1.1 |
| Example 1-34 | 589 | −0.40 | 1.5/1.3 | $1 \times 10^9$ | 83.7 | 0.46 | 1.1 |
| Example 1-35 | 589 | −0.40 | 1.5/1.3 | $9 \times 10^8$ | 83.7 | 0.47 | 1.1 |
| Example 1-36 | 589 | −0.40 | 1.5/1.3 | $8 \times 10^9$ | 83.6 | 0.45 | 1.1 |
| Example 1-37 | 589 | −0.40 | 1.5/1.3 | $3 \times 10^9$ | 83.6 | 0.45 | 1.1 |
| Example 1-38 | 589 | −0.40 | 1.5/1.3 | $5 \times 10^9$ | 83.6 | 0.45 | 1.1 |
| Example 1-39 | 589 | −0.38 | 1.5/1.3 | $4 \times 10^9$ | 83.7 | 0.46 | 1.1 |
| Example 1-40 | 589 | −0.38 | 1.5/1.3 | $1 \times 10^9$ | 83.7 | 0.46 | 1.1 |

TABLE 5

|  | Arithmetic mean roughness (SRa) (nm) | b Value (—) | Heat shrinkage at 150° C. for 30 min MD/TD (%) | Surface resistance value ($\Omega$) | Hunter whiteness (%) | Masking properties (OD) (—) | Apparent density (g/cm$^3$) |
| --- | --- | --- | --- | --- | --- | --- | --- |
| Example 1-41 | 165 | −0.69 | 1.7/1.4 | $1 \times 10^9$ | 84.0 | 0.48 | 1.1 |
| Example 1-42 | 165 | −0.79 | 1.7/1.4 | $6 \times 10^9$ | 83.9 | 0.47 | 1.1 |
| Example 1-43 | 165 | −0.83 | 1.7/1.4 | $3 \times 10^9$ | 83.8 | 0.47 | 1.1 |
| Example 1-44 | 165 | −0.63 | 1.7/1.4 | $9 \times 10^8$ | 84.1 | 0.48 | 1.1 |
| Example 1-45 | 165 | −0.69 | 1.7/1.4 | $1 \times 10^9$ | 84.1 | 0.48 | 1.1 |
| Example 1-46 | 165 | −0.69 | 1.7/1.4 | $5 \times 10^9$ | 84.1 | 0.48 | 1.1 |
| Example 1-47 | 165 | −0.69 | 1.7/1.4 | $1 \times 10^9$ | 83.9 | 0.49 | 1.1 |
| Example 1-48 | 165 | −0.69 | 1.7/1.4 | $9 \times 10^8$ | 84.1 | 0.49 | 1.1 |
| Example 1-49 | 165 | −0.69 | 1.7/1.4 | $8 \times 10^9$ | 83.9 | 0.48 | 1.1 |
| Example 1-50 | 165 | −0.69 | 1.7/1.4 | $3 \times 10^9$ | 84.0 | 0.48 | 1.1 |
| Example 1-51 | 165 | −0.69 | 1.7/1.4 | $5 \times 10^9$ | 84.1 | 0.48 | 1.1 |
| Example 1-52 | 165 | −0.62 | 1.7/1.4 | $4 \times 10^9$ | 84.2 | 0.49 | 1.1 |
| Example 1-53 | 165 | −0.63 | 1.7/1.4 | $1 \times 10^9$ | 84.2 | 0.49 | 1.1 |
| Example 1-54 | 186 | −0.80 | 1.6/1.4 | $1 \times 10^9$ | 83.7 | 0.46 | 1.0 |
| Example 1-55 | 522 | −0.46 | 1.7/1.4 | $6 \times 10^9$ | 82.5 | 0.36 | 1.0 |
| Example 1-56 | 522 | −0.51 | 1.7/1.4 | $3 \times 10^9$ | 82.2 | 0.36 | 1.0 |
| Example 1-57 | 522 | −0.50 | 1.7/1.4 | $9 \times 10^8$ | 82.3 | 0.35 | 1.0 |
| Example 1-58 | 522 | −0.46 | 1.7/1.4 | $1 \times 10^9$ | 82.5 | 0.36 | 1.0 |
| Example 1-59 | 522 | −0.46 | 1.7/1.4 | $5 \times 10^9$ | 82.5 | 0.36 | 1.0 |
| Example 1-60 | 522 | −0.46 | 1.7/1.4 | $1 \times 10^9$ | 82.5 | 0.36 | 1.0 |
| Example 1-61 | 522 | −0.46 | 1.7/1.4 | $9 \times 10^8$ | 82.5 | 0.38 | 1.0 |
| Example 1-62 | 522 | −0.46 | 1.7/1.4 | $8 \times 10^9$ | 82.5 | 0.37 | 1.0 |
| Example 1-63 | 522 | −0.46 | 1.7/1.4 | $3 \times 10^9$ | 82.5 | 0.37 | 1.0 |
| Example 1-64 | 522 | −0.46 | 1.7/1.4 | $5 \times 10^9$ | 82.5 | 0.37 | 1.0 |
| Example 1-65 | 522 | −0.46 | 1.7/1.4 | $4 \times 10^9$ | 82.5 | 0.36 | 1.0 |
| Example 1-66 | 522 | −0.43 | 1.7/1.4 | $1 \times 10^9$ | 82.6 | 0.37 | 1.0 |
| Example 1-67 | 522 | −0.43 | 1.7/1.4 | $1 \times 10^9$ | 82.6 | 0.37 | 1.0 |
| Example 1-68 | 986 | −0.82 | 1.7/1.4 | $1 \times 10^9$ | 85.4 | 0.56 | 1.0 |
| Example 1-69 | 1112 | −0.93 | 3.3/3.0 | $1 \times 10^9$ | 85.1 | 0.54 | 1.0 |

TABLE 6

| | Arithmetic mean roughness (SRa) (nm) | b Value (—) | Heat shrinkage at 150° C. for 30 min MD/TD (%) | Surface resistance value (Ω) | Hunter whiteness (%) | Masking properties (OD) (—) | Apparent density (g/cm³) |
|---|---|---|---|---|---|---|---|
| Comparative Example 1-1 | 88 | −0.25 | 1.3/1.0 | $5 \times 10^{14}$ | 66.5 | 0.18 | 1.4 |
| Comparative Example 1-2 | 565 | −0.98 | 1.7/1.4 | $3 \times 10^{14}$ | 84.6 | 0.53 | 1.0 |

TABLE 7

| Coating solution | Composition of coating agent (wt % of non-volatile components) | | | | | | | | |
|---|---|---|---|---|---|---|---|---|---|
| | IA | IB | IIA | IIB | IIC | III | IVA | IVB | IVC |
| 1 | 30 | 0 | 20 | 0 | 0 | 40 | 10 | 0 | 0 |
| 2 | 30 | 0 | 30 | 0 | 0 | 30 | 10 | 0 | 0 |
| 3 | 0 | 40 | 20 | 0 | 0 | 30 | 10 | 0 | 0 |
| 4 | 30 | 0 | 0 | 20 | 0 | 40 | 10 | 0 | 0 |
| 5 | 30 | 0 | 0 | 0 | 20 | 40 | 10 | 0 | 0 |
| 6 | 35 | 0 | 20 | 0 | 0 | 35 | 0 | 10 | 0 |
| 7 | 40 | 0 | 20 | 0 | 0 | 20 | 15 | 5 | 0 |
| 8 | 25 | 0 | 10 | 0 | 0 | 45 | 20 | 0 | 0 |
| 9 | 30 | 0 | 0 | 0 | 20 | 30 | 0 | 0 | 20 |
| 10 | 30 | 0 | 20 | 0 | 0 | 30 | 0 | 0 | 20 |
| 11 | 30 | 0 | 0 | 0 | 0 | 60 | 10 | 0 | 0 |
| 12 | 0 | 0 | 20 | 0 | 0 | 70 | 10 | 0 | 0 |

TABLE 8

| | Image quality appropriateness | Character/image peel-off and removal appropriateness | Print feedability | Writeability | Functional layer appearance |
|---|---|---|---|---|---|
| Example 1-1 | A | A | A | A | A |
| Example 1-2 | A | A | A | A | A |
| Example 1-3 | A | A | A | A | A |
| Example 1-4 | A | A | A | A | A |
| Example 1-5 | A | A | A | A | A |
| Example 1-6 | A | A | A | A | A |
| Example 1-7 | A | A | A | A | B |
| Example 1-8 | A | A | A | A | B |
| Example 1-9 | A | A | A | A | A |
| Example 1-10 | A | A | A | A | A |
| Example 1-11 | A | A | A | A | A |
| Example 1-12 | A | A | A | A | B |
| Example 1-13 | A | A | A | A | B |
| Example 1-14 | A | C | B | A | A |
| Example 1-15 | A | A | A | A | A |
| Example 1-16 | A | A | A | A | A |
| Example 1-17 | A | A | A | A | A |
| Example 1-18 | A | A | A | A | A |
| Example 1-19 | A | A | A | A | A |
| Example 1-20 | A | A | A | A | A |
| Example 1-21 | A | A | A | A | B |
| Example 1-22 | A | A | A | A | B |
| Example 1-23 | A | A | A | A | A |
| Example 1-24 | A | A | A | A | A |
| Example 1-25 | A | A | A | A | A |
| Example 1-26 | A | A | A | A | B |
| Example 1-27 | A | A | A | A | B |
| Example 1-28 | B | A | A | A | A |
| Example 1-29 | B | A | A | A | A |
| Example 1-30 | B | A | A | A | A |
| Example 1-31 | B | A | A | A | A |
| Example 1-32 | B | A | A | A | A |
| Example 1-33 | B | A | A | A | A |
| Example 1-34 | B | A | A | A | B |
| Example 1-35 | B | A | A | A | B |
| Example 1-36 | B | A | A | A | A |
| Example 1-37 | B | A | A | A | A |
| Example 1-38 | B | A | A | A | A |
| Example 1-39 | B | A | A | A | B |
| Example 1-40 | B | A | A | A | B |

TABLE 9

| | Image quality appropriateness | Character/image peel-off and removal appropriateness | Print feedability | Writeability | Functional layer appearance |
|---|---|---|---|---|---|
| Example 1-41 | A | A | A | B | A |
| Example 1-42 | A | A | A | B | A |
| Example 1-43 | A | A | A | B | A |
| Example 1-44 | A | A | A | B | A |
| Example 1-45 | A | A | A | B | A |
| Example 1-46 | A | A | A | B | A |
| Example 1-47 | A | A | A | B | B |
| Example 1-48 | A | A | A | B | B |
| Example 1-49 | A | A | A | B | A |
| Example 1-50 | A | A | A | B | A |
| Example 1-51 | A | A | A | B | A |
| Example 1-52 | A | A | A | B | B |
| Example 1-53 | A | A | A | B | B |
| Example 1-54 | A | B | A | B | A |
| Example 1-55 | B | A | A | A | A |
| Example 1-56 | B | A | A | A | A |
| Example 1-57 | B | A | A | A | A |
| Example 1-58 | B | A | A | A | A |
| Example 1-59 | B | A | A | A | A |
| Example 1-60 | B | A | A | A | B |
| Example 1-61 | B | A | A | A | B |
| Example 1-62 | B | A | A | A | A |
| Example 1-63 | B | A | A | A | A |
| Example 1-64 | B | A | A | A | A |
| Example 1-65 | B | A | A | A | B |
| Example 1-66 | B | A | A | A | B |
| Example 1-67 | B | A | A | A | A |
| Example 1-68 | A | B | A | A | A |
| Example 1-69 | C | C | A | A | A |

TABLE 10

| | Image quality appropriateness | Character/image peel-off and removal appropriateness | Print feedability | Writeability | Functional layer appearance |
|---|---|---|---|---|---|
| Comparative Example 1-1 | C | C | C | C | — |
| Comparative Example 1-2 | C | B | C | A | A |

Example 2 Group

Example 2-1 to Example 2-6 and Comparative Example 2-1 to Comparative Example 2-2 will now be described as Examples of the second embodiment.

Example 2-1

As an intermediate layer, a mixed source material obtained by mixing 80 parts by weight of polyethylene terephthalate chips having an intrinsic viscosity of 0.67 dl/g and 20 parts by weight of crystalline polypropylene homopolymer chips having a melt flow index of 10 ml/10 min was fed to a main vented biaxial extruder set to 280° C.

As a surface layer, a mixed source material obtained by mixing 15 parts by weight of polyethylene terephthalate chips having an intrinsic viscosity of 0.66 dl/g and containing 50% by weight of titanium oxide particles having an average particle diameter of 0.32 μm, 15 parts by weight of crystalline polypropylene homopolymer chips having a melt flow index of 8 ml/10 min, 10 parts by weight of polyethylene terephthalate chips having an intrinsic viscosity of 0.66 dl/g and containing 3.5% by weight of silica particles having an average particle diameter of 4.1 μm, and 60 parts by weight of polyethylene terephthalate chips having an intrinsic viscosity of 0.69 dl/g was fed to an auxiliary vented biaxial extruder set to 280° C.

The polymer from the main extruder as an intermediate layer and the polymer from the auxiliary extruder as a surface layer were co-extruded out of a cap via a gear pump and a filter so as to provide a two-type, three-layer (surface layer/intermediate layer/surface layer) layer configuration, and quenched and solidified on a cooling roll set to a surface temperature of 30° C. using an electrostatic pinning method, and thus an unstretched sheet having a thickness of 887 μm was obtained.

The resulting unstretched sheet was stretched 3.1-fold in the longitudinal direction at 92° C., then guided to a tenter, then stretched 3.8-fold in the transverse direction at 120° C., heat-treated at 235° C. for 10 seconds, and relaxed 10% in the transverse direction, and thus a biaxially oriented laminated white polyester film having a total thickness of 74 μm with a thickness configuration of 6 μm (surface layer)/62 μm (intermediate layer)/6 μm (surface layer) was obtained.

When the resulting laminated white polyester film was evaluated, the image quality appropriateness, character/image peel-off and removal appropriateness, and writeability were all favorable. The properties of this film are shown in Tables 12 and 13 below.

Example 2-2

A biaxially oriented laminated white polyester film having a thickness of 75 μm was obtained in the same manner as in Example 2-1 except that used as an intermediate layer was a mixed source material obtained by mixing in proportions of 40 parts by weight of polyethylene terephthalate chips having an intrinsic viscosity of 0.63 dl/g, 15 parts by weight of crystalline polypropylene homopolymer chips having a melt flow index of 7 ml/10 min, and 45% by weight of a recycled article made from the outside edge generated during polyester production in Example 2-1 and the master roll outside edge. The thickness of each layer of the resulting film was 6 μm/63 μm/6 μm. The total amount of polypropylene derived from the crystalline polypropylene homopolymer chips and derived from the recycled article in the intermediate layer was 24% by weight.

When the resulting laminated white polyester film was evaluated, the image quality appropriateness, character/image peel-off and removal appropriateness, and writeability were all favorable. The properties of this film are shown in Tables 12 and 13 below.

Example 2-3

A biaxially oriented laminated white polyester film having a thickness of 75 μm was obtained in the same manner as in Example 2-1 except that used as an intermediate layer was a mixed source material obtained by mixing in proportions of 3 parts by weight of polyethylene terephthalate chips having an intrinsic viscosity of 0.66 dl/g, 10 parts by weight of crystalline polypropylene homopolymer chips having a melt flow index of 10 ml/10 min, and 87% by weight of a recycled article made from the outside edge generated during polyester production in Example 2-1 and the master roll outside edge. The thickness of each layer of the resulting film was 6 μm/63 μm/6 μm.

When the resulting laminated white polyester film was evaluated, the character/image peel-off and removal appropriateness and writeability were all favorable. The properties of this film are shown in Tables 12 and 13 below.

Example 2-4

A biaxially oriented laminated white polyester film having a thickness of 75 μm was obtained in the same manner as in Example 2-1 except that used as a surface layer was a mixed source material obtained by mixing in proportions of 15 parts by weight of polyethylene terephthalate chips having an intrinsic viscosity of 0.66 dl/g and containing 50% by weight of titanium oxide particles having an average particle diameter of 0.12 μm, 15 parts by weight of crystalline polypropylene homopolymer chips having a melt flow index of 8 ml/10 min, 10 parts by weight of polyethylene terephthalate chips having an intrinsic viscosity of 0.66 dl/g and containing 3.5% by weight of silica particles having an average particle diameter of 4.1 μm, and 60 parts by weight of polyethylene terephthalate chips having an intrinsic viscosity of 0.69 dl/g. The thickness of each layer of the resulting film was 6 μm/63 μm/6 μm.

When the resulting laminated white polyester film was evaluated, the character/image peel-off and removal appropriateness and writeability were all favorable. The properties of this film are shown in Tables 12 and 13 below.

Example 2-5

A biaxially oriented laminated white polyester film having a thickness of 74 μm was obtained in the same manner as in Example 2-2 except that used as a surface layer was a mixed source material obtained by mixing in proportions of 15 parts by weight of polyethylene terephthalate chips having an intrinsic viscosity of 0.66 dl/g and containing 50% by weight of titanium oxide particles having an average particle diameter of 0.32 μm, 1.3 parts by weight of crystalline polypropylene homopolymer chips having a melt flow index of 8 ml/10 min, 1.6 parts by weight of polyethylene terephthalate chips having an intrinsic viscosity of 0.66 dl/g and containing 0.5% by weight of silica particles having an average particle diameter of 4.1 μm, and 82.1 parts by weight of polyethylene terephthalate chips having an intrinsic viscosity of 0.69 dl/g. The thickness of each layer of the resulting film was 6 μm/62 μm/6 μm.

When the resulting laminated white polyester film was evaluated, the image quality appropriateness was favorable. The properties of this film are shown in Tables 12 and 13 below.

Example 2-6

A biaxially oriented laminated white polyester film having a thickness of 75 μm was obtained in the same manner as in Example 2-2 except that used as a surface layer was a mixed source material obtained by mixing in proportions of 15 parts by weight of polyethylene terephthalate chips having an intrinsic viscosity of 0.65 dl/g and containing 50% by weight of titanium oxide particles having an average particle diameter of 0.32 μm, 0.5 parts by weight of crystalline polypropylene homopolymer chips having a melt flow index of 8 ml/10 min, 10 parts by weight of polyethylene terephthalate chips having an intrinsic viscosity of 0.66 dl/g and containing 3.5% by weight of silica particles having an average particle diameter of 4.1 μm, and 74.5 parts by weight of polyethylene terephthalate chips having an intrinsic viscosity of 0.68 dl/g. The thickness of each layer of the resulting film was 6 μm/63 μm/6 μm.

When the resulting laminated white polyester film was evaluated, the image quality appropriateness was favorable. The properties of this film are shown in Tables 12 and 13 below.

Comparative Example 2-1

A biaxially oriented laminated white polyester film having a thickness of 75 μm was obtained in the same manner as in Example 2-2 except that used as a surface layer was a mixed source material obtained by mixing in proportions of 15 parts by weight of polyethylene terephthalate chips having an intrinsic viscosity of 0.66 dl/g and containing 50% by weight of titanium oxide particles having an average particle diameter of 0.32 μm, 15 parts by weight of crystalline polypropylene homopolymer chips having a melt flow index of 8 ml/10 min, and 70 parts by weight of polyethylene terephthalate chips having an intrinsic viscosity of 0.66 dl/g and containing 5.0% by weight of silica particles having an average particle diameter of 11.1 μm. The thickness of each layer of the resulting film was 6 μm/63 μm/6 μm.

As shown in Tables 12 and 13, the resulting laminated white polyester film had poor character/image peel-off and removal appropriateness.

Comparative Example 2-2

A biaxially oriented laminated white polyester film having a thickness of 75 μm and thicknesses of the respective layers of 6 μm/63 μm/6 μm was obtained in the same manner as in Example 2-2 except that the heat treatment temperature was 201° C., and the film was heat-treated for 10 seconds, in the heat treatment step in the film forming process.

As shown in Tables 12 and 13, the resulting laminated white polyester film had poor image quality appropriateness and character/image peel-off and removal appropriateness.

TABLE 11

| | | | Surface layer | | | | | Intermediate layer | |
| --- | --- | --- | --- | --- | --- | --- | --- | --- | --- |
| | | | | TiO$_2$ | | SiO$_2$ | | | |
| | Film thickness (μm) | Surface layer thickness (μm) | Heat treatment temperature (° C.) | Polypropylene content (wt %) | average particle diameter (μm) | TiO$_2$ content (wt %) | average particle diameter (μm) | SiO$_2$ content (wt %) | Polypropylene content (wt %) | Recycled article content (wt %) |
| Example 2-1 | 74 | 6 | 235 | 15 | 0.32 | 7.5 | 4.1 | 0.35 | 20 | 0 |
| Example 2-2 | 75 | 6 | 235 | 15 | 0.32 | 7.5 | 4.1 | 0.35 | 15 | 45 |
| Example 2-3 | 75 | 6 | 235 | 15 | 0.32 | 7.5 | 4.1 | 0.35 | 10 | 87 |
| Example 2-4 | 75 | 6 | 235 | 15 | 0.12 | 7.5 | 4.1 | 0.35 | 20 | 0 |
| Example 2-5 | 74 | 6 | 235 | 1.3 | 0.32 | 7.5 | 4.1 | 0.008 | 15 | 45 |
| Example 2-6 | 75 | 6 | 235 | 0.5 | 0.32 | 7.5 | 4.1 | 0.35 | 15 | 45 |
| Comparative Example 2-1 | 75 | 6 | 235 | 15 | 0.32 | 7.5 | 11.1 | 3.50 | 15 | 45 |
| Comparative Example 2-2 | 75 | 6 | 201 | 15 | 0.32 | 7.5 | 4.1 | 0.35 | 15 | 45 |

TABLE 12

| | Arithmetic mean roughness (SRa) (nm) | b Value (—) | Heat shrinkage at 150° C. for 30 min MD/TD (%) | Hunter whiteness (%) | Masking properties (OD) (—) | Apparent density (g/cm$^3$) |
| --- | --- | --- | --- | --- | --- | --- |
| Example 2-1 | 553 | −0.98 | 1.6/1.4 | 84.6 | 0.53 | 1.0 |
| Example 2-2 | 582 | −0.82 | 1.6/1.4 | 84.5 | 0.54 | 1.0 |
| Example 2-3 | 577 | −0.41 | 1.5/1.4 | 83.7 | 0.45 | 1.1 |
| Example 2-4 | 515 | −0.47 | 1.6/1.4 | 82.3 | 0.37 | 1.0 |
| Example 2-5 | 125 | −0.66 | 1.5/1.4 | 83.9 | 0.50 | 1.0 |
| Example 2-6 | 189 | −0.81 | 1.6/1.5 | 83.7 | 0.47 | 1.1 |
| Comparative Example 2-1 | 981 | −0.80 | 1.6/1.5 | 85.7 | 0.55 | 1.0 |
| Comparative Example 2-2 | 1103 | −0.92 | 3.2/3.0 | 85.6 | 0.55 | 1.0 |

TABLE 13

| | Image quality appropriateness | Character/image peel-off and removal appropriateness | Writeability |
| --- | --- | --- | --- |
| Example 2-1 | A | A | A |
| Example 2-2 | A | A | A |
| Example 2-3 | B | A | A |
| Example 2-4 | B | A | A |
| Example 2-5 | A | B | B |
| Example 2-6 | A | B | B |
| Comparative Example 2-1 | A | C | A |
| Comparative Example 2-2 | C | C | A |

The invention claimed is:

1. A laminated white film comprising:
    a polyester film having an apparent density of 0.7 to 1.3 g/cm$^3$ and a thickness of 10 to 1000 μm,
    a functional layer disposed on at least one surface of the polyester film, the functional layer comprising an antistatic agent and a release agent, wherein the release agent comprises a linear or branched alkyl group having 6 or more carbon atoms and is not a silicone compound, an image forming layer laminated on the functional layer, the image forming layer including an image forming substance and a thermoplastic resin, and a resin layer laminated on the image forming layer, the resin layer including a thermosetting resin layer or an active energy ray curable resin layer, wherein the resin layer is peelable along with the image forming substance from the functional layer, and the polyester film comprises two surface layers and an intermediate layer, each of the two surface layers having an arithmetic mean roughness (Ra) of 522 nm or more and 950 nm or less.

2. The laminated white film according to claim 1, wherein the functional layer comprises the release agent in a proportion of 3% by weight or more in the functional layer.

3. The laminated white film according to claim 1, wherein the functional layer further comprises a crosslinked structure derived from a crosslinking agent comprising an oxazoline compound and/or an isocyanate-based compound.

4. The laminated white film according to claim 3, wherein the crosslinking agent comprises the oxazoline compound.

5. The laminated white film according to claim 1, wherein the functional layer is a recording layer.

6. The laminated white film according to claim 1, wherein the polyester film comprises metal compound particles.

7. The laminated white film according to claim 6, wherein the polyester film comprises silica particles, organic particles, or both of these as particles other than the metal compound particles.

8. The laminated white film according to claim 7, wherein an average particle diameter of the silica particles or the organic particles is more than 0.50 μm and 15.0 μm or less.

9. The laminated white film according to claim 6, wherein an average particle diameter of the metal compound particles is 0.05 μm or more and 0.50 μm or less.

10. The laminated white film according to claim 6, wherein a content of the metal compound particles in the polyester film is 1% by weight or more and 30% by weight or less.

11. The laminated white film according to claim 6, wherein a content of the silica particles or the organic particles in the polyester film is 0.005% by weight or more and 5% by weight or less.

12. The laminated white film according to claim 1, wherein each of the two surface layers comprises a polyester, a polymer incompatible with the polyester, metal compound particles, and a resin composition comprising silica particles, organic particles or both of the silica particles and the organic particles.

13. The laminated white film according to claim 12, wherein a content of the polyester-incompatible polymer in the surface layer of the polyester film is 1% by weight or more and 70% by weight or less.

14. The laminated white film according to claim 1, wherein the polyester film is a stretched film.

15. The laminated white film according to claim 1, wherein the release agent comprises a linear or branched alkyl group having 12 or more carbon atoms.

16. A method of removing an image forming substance from the laminated white film according to claim 1, comprising:

fixing the image forming substance on one surface of the polyester film by an electrophotographic printing to form the resin layer thereon; and peeling-off the image forming substance together with the resin layer from the functional layer.

17. The method according to claim 16,
wherein the resin layer is an active energy ray curable resin layer; and the resin layer is cured by irradiating an active energy lay.

18. The laminated white film according to claim 1, wherein the release agent comprises a long chain alkyl group-containing polymer compound obtained by reacting a polymer having a reactive group with a compound having an alkyl group, and the compound having an alkyl group is selected from the group consisting of long chain alkyl group-containing isocyanates, long chain alkyl group-containing acid chlorides and long chain alkyl group-containing amines.

19. A laminated white film comprising:

a polyester film having an apparent density of 0.7 to 1.3 g/cm$^3$ and a thickness of 10 to 1000 μm, a functional layer disposed on at least on surface of the polyester film, the functional layer comprising an antistatic agent and a release agent, wherein the release agent consists of long chain alkyl group-containing quaternary ammonium salts comprising a linear or branched alkyl group having 6 or more carbon atoms, and the release agent is not a silicone compound, an image forming layer laminated on the functional layer, the image forming layer comprising an image forming substance and a thermoplastic resin, and a resin layer laminated on the image forming layer, the resin layer including a thermosetting resin layer or an active energy ray curable resin layer, wherein the resin layer is peelable along with the image forming substance from the functional layer.

* * * * *